US012674920B2

(12) United States Patent
Suzuki et al.

(10) Patent No.: US 12,674,920 B2
(45) Date of Patent: Jul. 7, 2026

(54) DIFFRACTION ELEMENT

(71) Applicant: FUJIFILM Corporation, Tokyo (JP)

(72) Inventors: Masaaki Suzuki, Minamiashigara (JP); Koji Iijima, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

(21) Appl. No.: 18/820,531

(22) Filed: Aug. 30, 2024

(65) Prior Publication Data

US 2024/0427065 A1 Dec. 26, 2024

Related U.S. Application Data

(63) Continuation of application No. PCT/JP2023/007267, filed on Feb. 28, 2023.

(30) Foreign Application Priority Data

Mar. 1, 2022 (JP) ................................. 2022-030739

(51) Int. Cl.

*G02B 5/18* (2006.01)
*G02B 1/08* (2006.01)
*G02B 5/30* (2006.01)

(52) U.S. Cl.

CPC ............. *G02B 5/1833* (2013.01); *G02B 1/08* (2013.01); *G02B 5/1828* (2013.01);

(Continued)

(58) Field of Classification Search

CPC .. G02B 5/1833; G02B 5/1828; G02B 5/3016; G02B 5/3066; G02B 5/1857;

(Continued)

(56) References Cited

U.S. PATENT DOCUMENTS 12,360,302 B2 * 7/2025 Nozoe .................... H05B 33/02
2008/0278675 A1 11/2008 Escuti et al.

(Continued)

FOREIGN PATENT DOCUMENTS

JP 2008-532085 A 8/2008
JP 2012-505430 A 3/2012

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2023/007267, dated Sep. 12, 2024, with an English translation.

(Continued)

*Primary Examiner* — Stephone B Allen
*Assistant Examiner* — Adam W Booher
(74) *Attorney, Agent, or Firm* — Birch, Stewart, Kolasch & Birch, LLP

(57) ABSTRACT

Provided is a diffraction element having excellent aligning properties of a liquid crystal compound. The diffraction element includes an optically-anisotropic layer that has a liquid crystal alignment pattern in which an orientation of an optical axis derived from a liquid crystal compound changes while continuously rotating in at least one in-plane direction, in which a birefringence Δn of the optically-anisotropic layer is 0.20 or more, the optically-anisotropic layer includes a surfactant, and in a case where components in a depth direction are analyzed by time-of-flight secondary ion mass spectrometry from one surface to another surface of the optically-anisotropic layer, a depth-direction profile of a secondary ion intensity derived from the surfactant is obtained, a position corresponding to a thickness of 20% from the one surface of the optically-anisotropic layer is (Continued)

represented by a position D20, a position corresponding to a thickness of 80% from the one surface is represented by a position D80, and an average value of secondary ion intensities derived from the surfactant between the position D20 and the position D80 is calculated, in a region from the position D20 to the position D80, a peak having a size of 1.1 times or more the average value is observed and a peak having a size of 5 times or more the average value is not observed.

15 Claims, 7 Drawing Sheets

(52) U.S. Cl.
CPC ......... *G02B 5/3016* (2013.01); *G02B 5/3066* (2013.01); *G02B 5/1857* (2013.01); *G02B 5/3091* (2013.01)

(58) Field of Classification Search
CPC .......... G02B 5/3091; G02B 5/18; G02B 5/30; G02B 5/1866; G02B 5/1871; G02B 5/3025; G02B 5/3083; G02B 1/08; G02B 2005/1804
See application file for complete search history.

(56) References Cited

U.S. PATENT DOCUMENTS

2012/0236219 A1 9/2012 Kroll et al.
2012/0307169 A1 12/2012 Ohyama et al.
2013/0335683 A1 12/2013 Escuti et al.
2020/0271839 A1 8/2020 Saitoh et al.
2020/0348545 A1 11/2020 Sato et al.
2021/0026049 A1 1/2021 Saitoh et al.
2021/0088703 A1 3/2021 Saitoh et al.
2021/0149255 A1 5/2021 Sato et al.
2022/0404535 A1* 12/2022 Nozoe .................. G02B 5/3016

FOREIGN PATENT DOCUMENTS

JP 2012-252220 A 12/2012
JP 2013-512471 A 4/2013
WO WO 2019/093228 A1 5/2019
WO WO 2019/131918 A1 7/2019
WO WO 2019/189586 A1 10/2019
WO WO 2019/221294 A1 11/2019
WO WO 2020/022501 A1 1/2020
WO WO 2020/022513 A1 1/2020

OTHER PUBLICATIONS

International Search Report (Form PCT/ISA/210) for International Application No. PCT/JP2023/007267, dated May 16, 2023, with an English translation.

Zhan et al., "Fabrication of Pancharatnam-Berry phase optical elements with highly stable polarization holography," Optics Express, vol. 27, No. 3, 2019, pp. 2632-2642.

* cited by examiner

DIFFRACTION ELEMENT

CROSS-REFERENCE TO RELATED APPLICATIONS

This application is a Continuation of PCT International Application No. PCT/JP2023/007267 filed on Feb. 28, 2023, which claims priority under 35 U.S.C. § 119(a) to Japanese Patent Application No. 2022-030739 filed on Mar. 1, 2022. The above applications are hereby expressly incorporated by reference, in their entirety, into the present application.

BACKGROUND OF THE INVENTION

1. Field of the Invention

The present invention relates to a diffraction element.

2. Description of the Related Art

A diffraction element that controls a direction of light is used in many optical devices or systems. For example, the diffraction element that controls a direction of light is used in various optical devices, for example, a backlight of a liquid crystal display device, a head mounted display (HMD) such as Augmented Reality (AR) glasses or virtual reality (VR) that display a virtual image, various information, or the like to be superimposed on a scene that is actually being seen, a projector, a beam steering device, or a sensor for detecting a thing or measuring the distance to a thing.

In this optical device, a reduction in thickness and size has progressed. Therefore, a reduction in thickness and size is desired for the diffraction element used in the optical device. As the thin and small diffraction element, the use of an optically-anisotropic layer consisting of a liquid crystal composition including a liquid crystal compound is disclosed.

For example, JP2008-532085A describes a polarization diffraction grating including a polarization sensitive photoalignment layer and a liquid crystal composition disposed on the photoalignment layer, in which an anisotropic alignment pattern corresponding to a polarization hologram is disposed in the photoalignment layer, and the liquid crystal composition is aligned in the alignment pattern. The alignment pattern in the polarization diffraction grating periodically changes along at least one straight line in a plane, and by using the optically-anisotropic layer that changes this alignment pattern in the plane, a diffraction element that is thin and controls a transmission direction of incident light can be realized. Tao Zhan et al., Fabrication of Pancharatnam-Berry phase optical elements with highly stable polarization holography, Optics Express, Vol. 27, No. 3/4 Feb. 2020, pp 2632-2642 describes a method of preparing a diffraction element in which a thin film of a photo-alignment material is spin-coated on a glass substrate and is exposed to form a polarization hologram (alignment pattern) due to interference of circular polarized light beams such that liquid crystal molecules are aligned in the alignment pattern of the alignment film.

SUMMARY OF THE INVENTION

According to an investigation by the present inventors, it was found that, in a diffraction element including an optically-anisotropic layer in which liquid crystal compounds are arranged in a predetermined alignment pattern, there is a problem in that, in a case where aligning properties of the liquid crystal compound are poor, a diffraction efficiency deteriorates.

An object of the present invention is to solve the above-described problem of the related art and to provide a diffraction element having excellent aligning properties of a liquid crystal compound.

In order to achieve the object, the present invention has the following configurations.

[1] A diffraction element comprising:

an optically-anisotropic layer that has a liquid crystal alignment pattern in which an orientation of an optical axis derived from a liquid crystal compound changes while continuously rotating in at least one in-plane direction, in which a birefringence Δn of the optically-anisotropic layer is 0.20 or more, the optically-anisotropic layer includes a surfactant, and in a case where components of the optically-anisotropic layer in a depth direction are analyzed by time-of-flight secondary ion mass spectrometry while irradiating the optically-anisotropic layer with an ion beam from one surface to another surface of the optically-anisotropic layer, a depth-direction profile of a secondary ion intensity derived from the surfactant is obtained, a depth position corresponding to a thickness of 20% from the one surface to the other surface side of the optically-anisotropic layer is represented by a position D20, a depth position corresponding to a thickness of 80% from the one surface to the other surface side of the optically-anisotropic layer is represented by a position D80, and an average value of secondary ion intensities derived from the surfactant between the position D20 and the position D80 is calculated, in a region from the position D20 to the position D80, a peak that shows a secondary ion intensity having a size of 1.1 times or more the average value is observed and a peak that shows a secondary ion intensity having a size of 5 times or more the average value is not observed.

[2] The diffraction element according to [1], in which in a case where two or more peaks that show the secondary ion intensity having a size of 1.1 times or more the average value are provided, a distance between the peaks adjacent to each other is represented by T, and a length over which the orientation of the optical axis derived from the liquid crystal compound in the liquid crystal alignment pattern rotates by 180° in a plane is set as a single period Λ, the distance T between the peaks and the single period Λ of the liquid crystal alignment pattern satisfy $$0.05 \le T/\Lambda \le 0.25.$$

[3] The diffraction element according to [1] or [2], in which the optically-anisotropic layer has a region where the optical axis of the liquid crystal compound is twisted in a thickness direction, and a twisted angle of the optically-anisotropic layer in the thickness direction is 10° to 360°.

[4] The diffraction element according to any one of [1] to [3], in which the surfactant includes a fluorine atom and has a molecular weight of 800 to 2000.

[5] The diffraction element according to any one of [1] to [4], in which the birefringence Δn of the optically-anisotropic layer is 0.40 or less.

According to the present invention, there is provided a diffraction element having excellent aligning properties of a liquid crystal compound.

DESCRIPTION OF THE PREFERRED EMBODIMENTS

Hereinafter, the details of the present invention will be described. In the present specification, numerical ranges represented by "to" include numerical values before and after "to" as lower limit values and upper limit values.

In addition, in the present specification, "(meth)acrylate" represents both of acrylate and methacrylate, "(meth)acryloyl group" represents both of an acryloyl group and a methacryloyl group, and "(meth)acryl" represents both of acryl and methacryl.

In the present invention, visible light refers to light having a wavelength which can be observed by human eyes among electromagnetic waves and refers to light in a wavelength range of 380 to 780 nm. Ultraviolet light is light in a wavelength range of 10 nm or longer and shorter than 380 nm, and infrared light is light in a wavelength range of longer than 780 nm.

In addition, in visible light, light in a wavelength range of 420 to 490 nm refers to blue light (B), light in a wavelength range of 495 to 570 nm refers to green light (G), and light in a wavelength range of 620 to 750 nm refers to red light (R).

[Diffraction Element]

A diffraction element according to an embodiment of the present invention comprises:

an optically-anisotropic layer that has a liquid crystal alignment pattern in which an orientation of an optical axis derived from a liquid crystal compound changes while continuously rotating in at least one in-plane direction, in which a birefringence Δn of the optically-anisotropic layer is 0.20 or more, the optically-anisotropic layer includes a surfactant, and in a case where components of the optically-anisotropic layer in a depth direction are analyzed by time-of-flight secondary ion mass spectrometry while irradiating the optically-anisotropic layer with an ion beam from one surface to another surface of the optically-anisotropic layer, a depth-direction profile of a secondary ion intensity derived from the surfactant is obtained, a depth position corresponding to a thickness of 20% from the one surface to the other surface side of the optically-anisotropic layer is represented by a position D20, a depth position corresponding to a thickness of 80% from the one surface to the other surface side of the optically-anisotropic layer is represented by a position D80, and an average value of secondary ion intensities derived from the surfactant between the position D20 and the position D80 is calculated, in a region from the position D20 to the position D80, a peak that shows a secondary ion intensity having a size of 1.1 times or more the average value is observed and a peak that shows a secondary ion intensity having a size of 5 times or more the average value is not observed.

Figure 1:
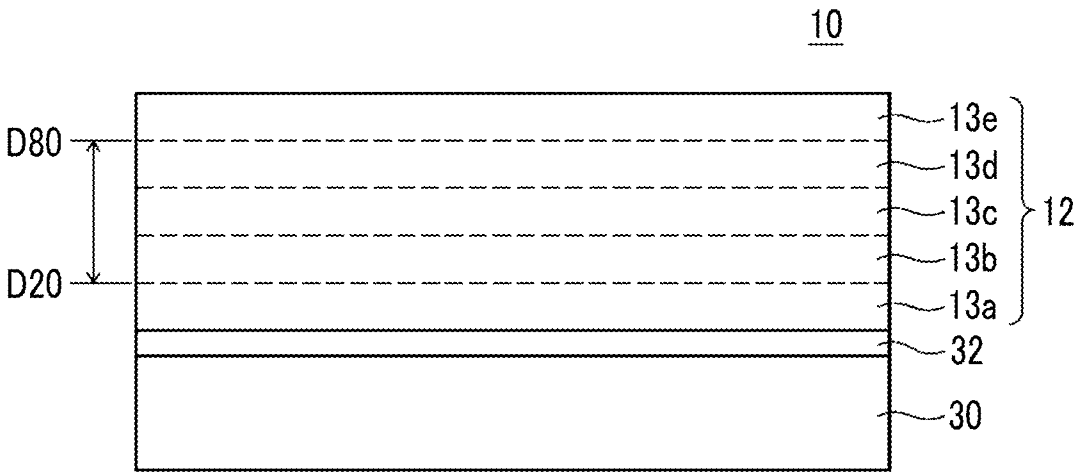
FIG. 1 is a schematic diagram showing an example of a diffraction element according to the present invention.

FIG. 1 conceptually shows an example of the diffraction element according to the embodiment of the present invention.

A diffraction element 10 shown in FIG. 1 includes an optically-anisotropic layer 12, an alignment film 32, and a support 30.

Figure 2:
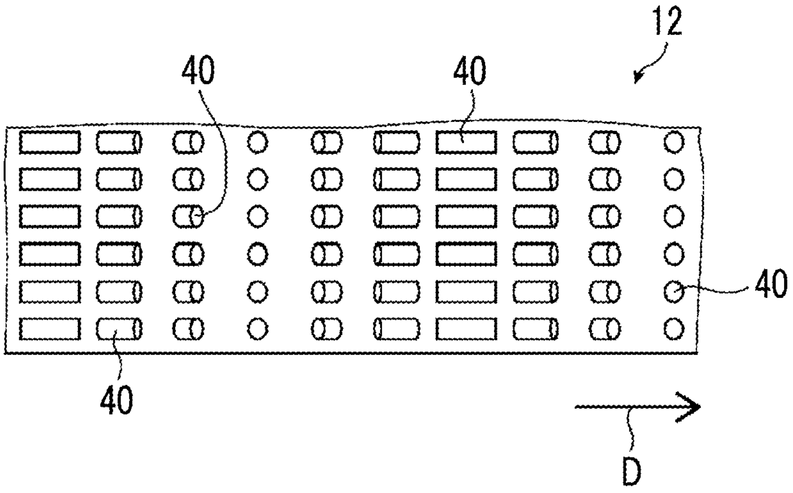
FIG. 2 is a diagram conceptually showing a configuration of an optically-anisotropic layer in the diffraction element shown in FIG. 1.
Figure 3:
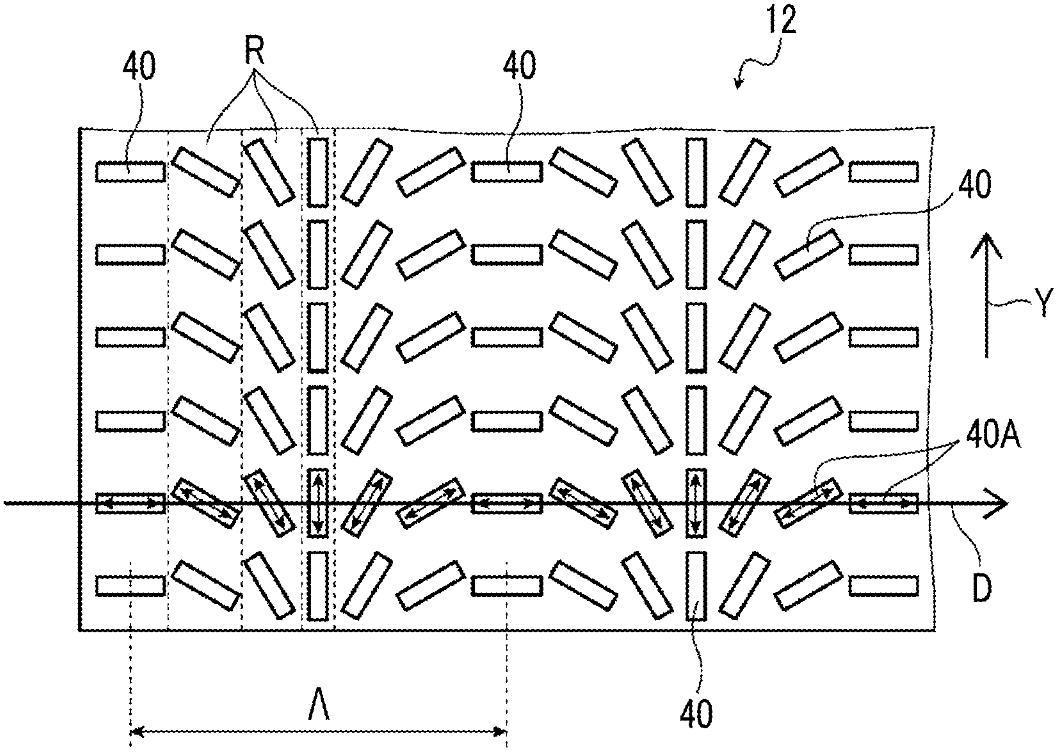
FIG. 3 is a plan view showing the optically-anisotropic layer shown in FIG. 2.

The optically-anisotropic layer 12 is formed of a liquid crystal composition including a liquid crystal compound. In addition, as shown in FIGS. 2 and 3 described below, the optically-anisotropic layer 12 has a liquid crystal alignment pattern in which an orientation of an optical axis derived from the liquid crystal compound continuously rotates in one in-plane direction. Although described below, the optically-anisotropic layer having the liquid crystal alignment pattern in which the orientation of the optical axis derived from the liquid crystal compound continuously rotates in the one in-plane direction functions as a diffraction element that diffracts transmitted light. That is, the diffraction element according to the embodiment of the present invention functions as the diffraction element that diffracts transmitted light.

<Optically-Anisotropic Layer>

The optically-anisotropic layer will be described using FIGS. 2 and 3.

In the example shown in FIGS. 2 and 3, the optically-anisotropic layer is formed by immobilizing a liquid crystal phase where a liquid crystal compound is aligned and has a liquid crystal alignment pattern in which an orientation of an optical axis derived from the liquid crystal compound changes while continuously rotating in at least one in-plane direction.

In the optically-anisotropic layer, as conceptually shown in FIG. 2, a liquid crystal compound 40 is not helically twisted and rotated in a thickness direction, and the liquid crystal compounds 40 at the same position in a plane direction are aligned such that the orientations of optical axes 40A thereof face the same orientation.

<<Liquid Crystal Alignment Pattern of Optically-Anisotropic Layer>>

The optically-anisotropic layer has the liquid crystal alignment pattern in which the orientation of the optical axis 40A derived from the liquid crystal compound 40 changes while continuously rotating in the one direction in a plane of the optically-anisotropic layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction. In the following description, the optical axis 40A derived from the liquid crystal compound 40 will also be referred to as "the optical axis 40A of the liquid crystal compound 40" or "the optical axis 40A".

FIG. 3 conceptually shows a plan view of the optically-anisotropic layer.

The plan view is a view in a case where the optically-anisotropic layer is seen from the top in FIG. 2, that is, a view in a case where the optically-anisotropic layer is seen from the thickness direction (laminating direction of the respective layers (films)).

In addition, in FIG. 3, in order to clarify the configuration of the optically-anisotropic layer, only the liquid crystal compound 40 on the surface is shown.

As shown in FIG. 3, on the surface, the liquid crystal compound 40 forming the optically-anisotropic layer has the liquid crystal alignment pattern in which the orientation of the optical axis 40A changes while continuously rotating in a predetermined one direction indicated by arrow D (hereinafter, referred to as the arrangement axis D) in a plane of the optically-anisotropic layer. In the example shown in the drawing, the liquid crystal compound 40 has the liquid crystal alignment pattern in which the optical axis 40A of the liquid crystal compound 40 changes while continuously rotating clockwise in the arrangement axis D direction.

The liquid crystal compounds 40 forming the optically-anisotropic layer are two-dimensionally arranged the arrangement axis D and in a direction orthogonal to one direction of the arrangement axis D (arrangement axis D direction).

In the following description, the direction orthogonal to the arrangement axis D direction will be referred to as "Y direction" for convenience of description. That is, the arrow Y direction is a direction orthogonal to the one direction in which the orientation of the optical axis 40A of the liquid crystal compound 40 changes while continuously rotating in the optically-anisotropic layer. Accordingly, in FIGS. 1 and 2 and FIGS. 4, 5, and 8 to 10 described below, the Y direction is a direction orthogonal to the paper plane.

Specifically, "the orientation of the optical axis 40A of the liquid crystal compound 40 changes while continuously rotating in the arrangement axis D direction (the predetermined one direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present invention, regarding a rotation direction of the optical axis 40A of the liquid crystal compound in the arrangement axis D direction, the liquid crystal compound rotates in an orientation in which the angle between the liquid crystal compounds 40 (the optical axes 40A) adjacent to each other in the arrangement axis D direction decreases. Accordingly, in the optically-anisotropic layer shown in FIGS. 2 and 3, the optical axis 40A of the liquid crystal compound 40 rotates to the right (clockwise) in the direction indicated by the arrow of the arrangement axis D.

On the other hand, in the liquid crystal compound 40 forming the optically-anisotropic layer, the orientations of the optical axes 40A are the same in the Y direction orthogonal to the arrangement axis D direction, that is, the Y direction orthogonal to the one direction in which the optical axis 40A continuously rotates.

In other words, in the liquid crystal compound 40 forming the optically-anisotropic layer, angles between the optical axes 40A of the liquid crystal compound 40 and the arrangement axis D direction are the same in the Y direction.

In the liquid crystal compounds arranged in the Y direction in the optically-anisotropic layer, the angles between the optical axes 40A and the arrangement axis D direction (the one direction in which the orientation of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction orthogonal to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In the optically-anisotropic layer, in the liquid crystal alignment pattern of the liquid crystal compound 40, a length (distance) over which the optical axis 40A of the liquid crystal compound 40 rotates by 180° in the arrangement axis D direction in which the optical axis 40A changes while continuously rotating in a plane is a length Λ of a single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match with each other is the length Λ of the single period. In the following description, the length Λ of the single period will also be referred to as "single period Λ".

In the liquid crystal alignment pattern of the optically-anisotropic layer, the single period Λ is repeated in the arrangement axis D direction, that is, in the one direction in which the orientation of the optical axis 40A changes while continuously rotating.

In a case where circularly polarized light is incident into the above-described optically-anisotropic layer, the light is refracted such that the direction of the circularly polarized light is converted.

Figure 4:
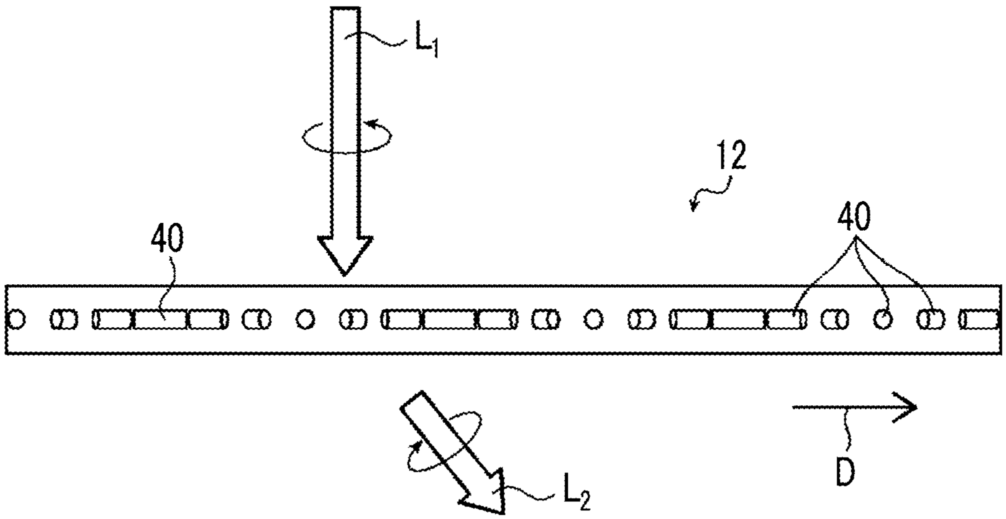
FIG. 4 is a diagram showing an action of the diffraction element.
Figure 5:
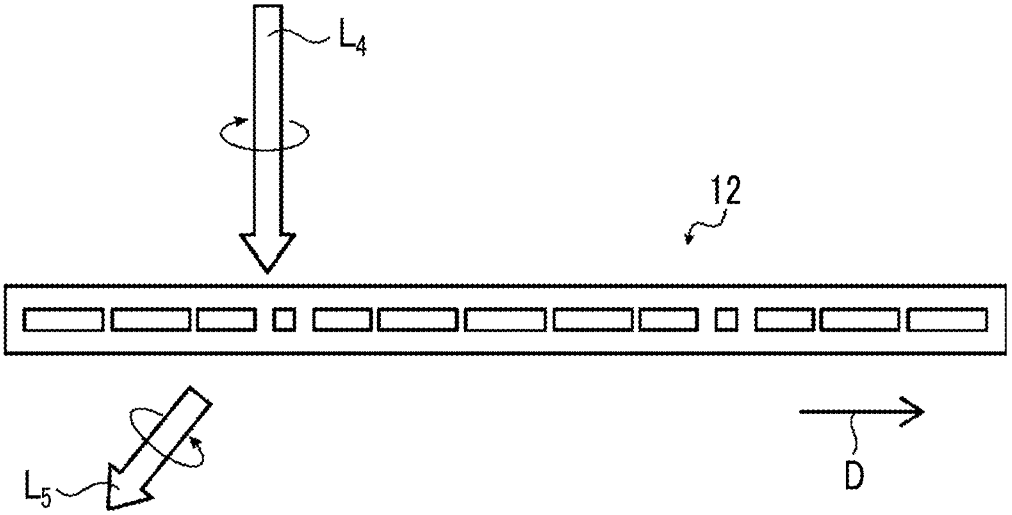
FIG. 5 is a diagram showing the action of the diffraction element.

This action is conceptually shown in FIGS. 4 and 5. In the optically-anisotropic layer, the value of the product of the difference in refractive index of the liquid crystal compound and the thickness of the optically-anisotropic layer is Λ/2.

As shown in FIG. 4, in a case where the value of the product of the difference in refractive index of the liquid crystal compound and the thickness of the optically-anisotropic layer in the optically-anisotropic layer is Λ/2 and incidence light $L_1$ as left circularly polarized light is incident into the optically-anisotropic layer, the incidence light $L_1$ transmits through the optically-anisotropic layer to be imparted with a retardation of 180°, and transmitted light $L_2$ is converted into right circularly polarized light.

In addition, the liquid crystal alignment pattern formed in the optically-anisotropic layer is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction. In the example shown in FIG. 4, the transmitted light $L_2$ is diffracted to travel in the lower right direction.

On the other hand, as shown in FIG. 5, in a case where the value of the product of the difference in refractive index of the liquid crystal compound of the optically-anisotropic layer and the thickness of the optically-anisotropic layer is Λ/2 and incidence light $L_4$ as right circularly polarized light is incident into the optically-anisotropic layer, the incidence light $L_4$ transmits through the optically-anisotropic layer to be imparted with a retardation of 180° and is converted into transmitted light $L_5$ of left circularly polarized light.

In addition, the liquid crystal alignment pattern formed in the optically-anisotropic layer is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow direction of the arrangement axis D with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction. In the example shown in FIG. 5, the transmitted light $L_5$ is diffracted to travel in the lower left direction.

As described above, refraction angles of the transmitted light components $L_2$ and $L_5$ can be adjusted depending on the length of the single period Λ of the liquid crystal alignment pattern formed in the optically-anisotropic layer. Specifically, even in the optically-anisotropic layer, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 4 and 5, the rotation direction of the optical axis 40A toward the arrangement axis D direction is clockwise. By setting this rotation direction to be counterclockwise, the refraction direction of transmitted light can be reversed. Specifically, in FIGS. 4 and 5, in a case where the rotation direction of the optical axis 40A toward the arrangement axis D direction is counterclockwise, left circularly polarized light incident into the optically-anisotropic layer from the upper side in the drawing transmits through the optically-anisotropic layer such that the transmitted light is converted into right circularly polarized light and is diffracted to travel in the lower left direction in the drawing. In addition, right circularly polarized light incident into the optically-anisotropic layer from the upper side in the drawing transmits through the optically-anisotropic layer such that the transmitted light is converted into left circularly polarized light and is diffracted to travel in the lower right direction in the drawing.

Here, in the present invention, a birefringence (difference in refractive index) Δn of the optically-anisotropic layer 12 is 0.20 or more, the optically-anisotropic layer 12 includes a surfactant, and in a case where components of the optically-anisotropic layer 12 in a depth direction are analyzed by time-of-flight secondary ion mass spectrometry while irradiating the optically-anisotropic layer with an ion beam from one surface to another surface of the optically-anisotropic layer, a depth-direction profile of a secondary ion intensity derived from the surfactant is obtained, a depth position corresponding to a thickness of 20% from the one surface to the other surface side of the optically-anisotropic layer 12 is represented by a position D20, a depth position corresponding to a thickness of 80% from the one surface to the other surface side of the optically-anisotropic layer is represented by a position D80, and an average value of secondary ion intensities derived from the surfactant between the position D20 and the position D80 (hereinafter, also simply referred to as the average value) is calculated, in a region from the position D20 to the position D80, a peak that shows a secondary ion intensity having a size of 1.1 times or more the average value (hereinafter, also referred to as the peak) is observed and a peak that shows a secondary ion intensity having a size of 5 times or more the average value is not observed.

Although described below, by forming the optically-anisotropic layer 12 on the alignment film 32 in which the liquid crystal compound 40 is aligned in a predetermined pattern, a liquid crystal alignment pattern in which the orientation of the optical axis 40A derived from the liquid crystal compound 40 changes while continuously rotating in at least one in-plane direction is formed. As described above, in order to obtain the action of transmitting and diffracting light by the optically anisotropic layer 12, the value of the product of the birefringence Δn of the liquid crystal compound 40 of the optically-anisotropic layer 12 and the thickness of the optically-anisotropic layer 12 needs to be λ/2. That is, the optically-anisotropic layer 12 needs to have a predetermined thickness depending on the birefringence Δn of the liquid crystal compound 40.

However, in a case where the thickness of the optically-anisotropic layer increases, an alignment restriction force of the alignment film is likely to act at a position distant from the alignment film, aligning properties of the liquid crystal compound in the optically-anisotropic layer deteriorate, and there is a problem in that the diffraction efficiency deteriorates.

On the other hand, the optically-anisotropic layer is formed by repeating application and curing for multilayer application. By forming a thin liquid crystal immobilized layer forming the optically-anisotropic layer multiple times to form an optically-anisotropic layer having a desired thickness, the liquid crystal alignment pattern of the lower liquid crystal immobilized layer acts as the alignment film on the liquid crystal immobilized layer formed on the lower liquid crystal immobilized layer. Therefore, the liquid crystal compound is appropriately aligned in each of the liquid crystal immobilized layers, the aligning properties as the entire optically-anisotropic layer are improved, and the diffraction efficiency can be improved.

However, according to an investigation by the present inventors, it was found that, even in the optically-anisotropic layer formed by the multilayer application, there is a case where the aligning properties may be insufficient and the diffraction efficiency decreases. The present inventors conducted an investigation on this point and found that, in a case where the optically-anisotropic layer is formed by the multilayer application, the surfactant is unevenly distributed in the vicinity of an interface between the liquid crystal immobilized layers formed by the multilayer application.

In this case, it was found that, in a case where the amount of uneven distribution of the surfactant at the interface between the liquid crystal immobilized layers is too large, the smooth liquid crystal immobilized layer cannot be formed due to the occurrence of cissing during the formation of the next liquid crystal immobilized layer on the lower liquid crystal immobilized layer, and the aligning properties of the liquid crystal compound also deteriorate.

On the other hand, in a case where the amount of uneven distribution of the surfactant at the interface between the liquid crystal immobilized layers is too small, smoothness and aligning properties cannot be ensured. The situation where the amount of uneven distribution is too small as described above may occur in a case where the addition amount of the surfactant is insufficient, a case where uneven distribution properties on the surface of the coating film are low, or a case where the surfactant is designed such that the surfactant is removed by a solvent in the liquid crystal composition forming the upper liquid crystal immobilized layer.

On the other hand, in the diffraction element according to the embodiment of the present invention, in a case where components of the optically-anisotropic layer 12 in a depth direction are analyzed by time-of-flight secondary ion mass spectrometry while irradiating the optically-anisotropic layer with an ion beam from one surface to another surface of the optically-anisotropic layer 12, a depth-direction profile of a secondary ion intensity derived from the surfactant is obtained, a depth position corresponding to a thickness of 20% from the one surface to the other surface side of the optically-anisotropic layer 12 is represented by a position D20, a depth position corresponding to a thickness of 80% from the one surface to the other surface side of the optically-anisotropic layer 12 is represented by a position D80, and an average value of secondary ion intensities derived from the surfactant between the position D20 and the position D80 is calculated, in a region from the position D20 to the position D80, a peak that shows a secondary ion intensity having a size of 1.1 times or more the average value is observed and a peak that shows a secondary ion intensity having a size of 5 times or more the average value is not observed.

This point will be described using FIG. 6.

First, as shown in FIG. 1, the optically-anisotropic layer 12 in the diffraction element 10 according to the embodiment of the present invention is formed by the multilayer application and has a configuration in which a plurality of (five layers in the example shown in FIG. 1) liquid crystal immobilized layers 13*a* to 13*e* are laminated. That is, in FIG. 1, a broken line in the optically-anisotropic layer 12 represents the interface between the liquid crystal immobilized layers.

The liquid crystal immobilized layers have the same liquid crystal alignment pattern, and the optical axes of the liquid crystal compounds 40 present at the same position in the plane direction face the same direction.

Figure 6:
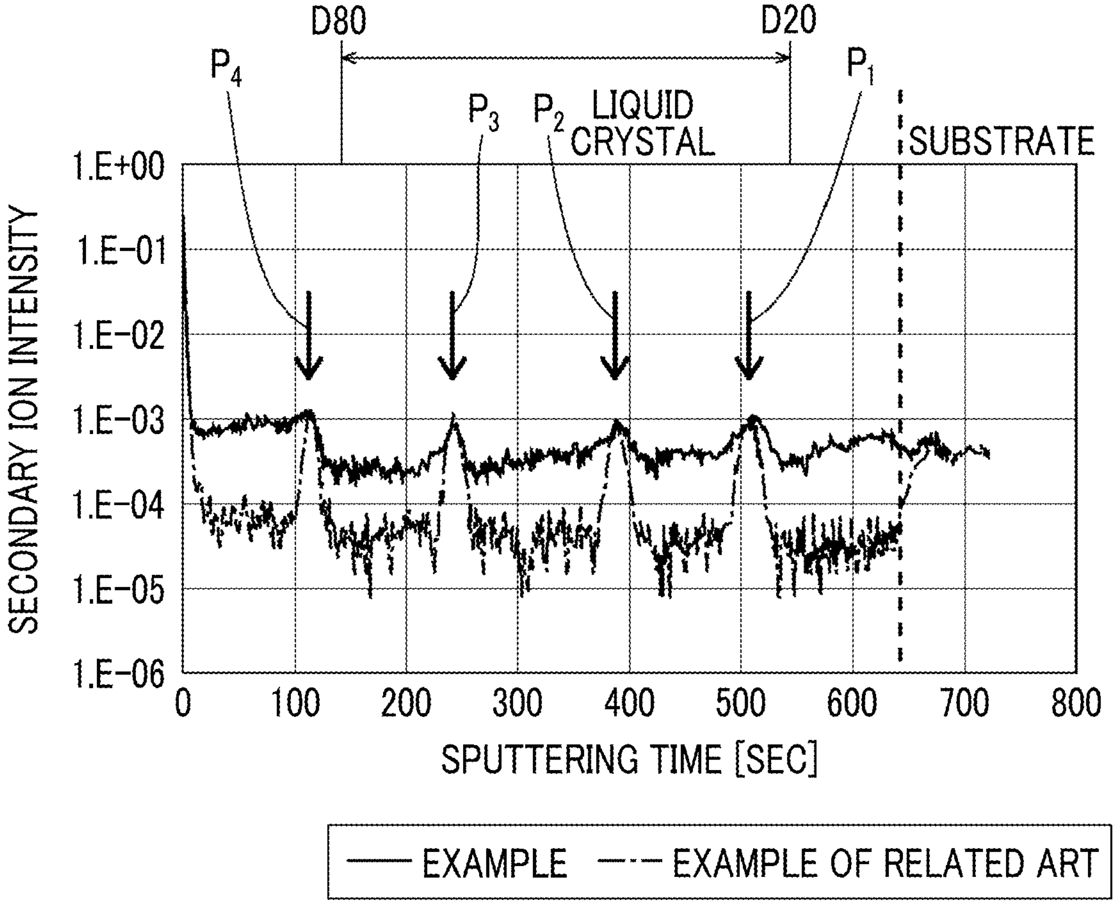
FIG. 6 is a graph showing a relationship between a sputtering time and a secondary ion intensity.

In a case where components of the optically-anisotropic layer 12 in a depth direction are analyzed by time-of-flight secondary ion mass spectrometry (TOF-SIMS) while performing ion sputtering from a surface of the optically-anisotropic layer 12 opposite to the support 30 to a surface thereof on the support 30 side, a depth-direction profile of a secondary ion intensity derived from the surfactant can be obtained as shown in FIG. 6. In a graph of FIG. 6, the vertical axis represents the secondary ion intensity derived from the surfactant, and the horizontal axis represents a sputtering time, that is, a depth from one surface. In FIG. 6, a profile indicated by the solid line is a profile corresponding to the present invention, and the profile indicated by a chain line is a profile corresponding to an example of the related art.

The TOF-SIMS is specifically described in "Surface Analysis Technology Library Secondary Ion Mass Spectrometry" edited by the Surface Science Society of Japan and published by Maruzen Co., Ltd. (1999).

The profile in FIG. 6 corresponds to a result of analyzing components in each of the layers in the depth direction by TOF-SIMS while performing ion sputtering from one surface (surface opposite to the support 30) to another surface (surface on the support 30 side) of the optically-anisotropic layer 12 disposed on the support 30 shown in FIG. 1.

As described above, the optically-anisotropic layer 12 shown in FIG. 1 corresponds to an example of an aspect in which a composition for forming the optically-anisotropic layer including the predetermined components (the liquid crystal compound and the surfactant) is applied to the support 30 including the alignment film 32 multiple times to form the optically anisotropic layer.

A position of 0 in the horizontal axis in FIG. 6 corresponds to the surface of the optically-anisotropic layer 12 opposite to the support 30, and a position indicated by a broken line in the horizontal axis corresponds to the surface of the optically-anisotropic layer 12 on the support 30 side. That is, a region from 0 to the position indicated by the broken line in the horizontal axis corresponds to a region from the one surface to the other surface of the optically-anisotropic layer 12.

In a case where the components of the specific optically-anisotropic layer in the depth direction are analyzed by TOF-SIMS while irradiating the optically-anisotropic layer with the ion beam to the optically anisotropic layer, a series of operations are repeated, the operations including: performing the component analysis in a surface depth region of 1 to 2 nm; further digging through the optically anisotropic layer in the depth direction by 1 nm to several hundreds of nm; and performing the component analysis in the next surface depth region of 1 to 2 nm.

The depth-direction profile shown in FIG. 6 shows the result of the secondary ion intensity derived from the surfactant.

In the present specification, the "secondary ion intensity derived from the surfactant" obtained by the depth-direction profile detected by analyzing the components of the optically-anisotropic layer in the depth direction by TOF-SIMS refers to the intensity of fragment ions derived from the surfactant. For example, depending on the kind of the surfactant, for example, in the case of a surfactant including an element or a structure such as F, Si, Na, K, or SOx, an intensity of secondary ions derived from the element or the structure in the surfactant can be used.

As shown in FIG. 6, in a case where the components of the optically-anisotropic layer in the depth direction are analyzed by the TOF-SIMS method while irradiating the optically-anisotropic layer with an ion beam from one surface to another surface of the optically-anisotropic layer, a plurality of peaks of the secondary ion intensity derived from the surfactant are observed as indicated by an arrow in FIG. 6. The peaks of the secondary ion intensity are observed corresponding to depths of interfaces between the liquid crystal immobilized layers 13*a* to 13*e* in the optically-anisotropic layer 12 shown in FIG. 1. That is, the profile shown in FIG. 6, the profile includes a peak (arrow $P_1$) observed at a depth position of an interface between the first liquid crystal immobilized layer 13*a* on the support 30 side and the second liquid crystal immobilized layer 13*b* formed on the first liquid crystal immobilized layer 13*a*, a peak (arrow $P_2$) observed at a depth position of an interface between the second liquid crystal immobilized layer 13*b* and the third liquid crystal immobilized layer 13*c* formed on the second liquid crystal immobilized layer 13*b*, a peak (arrow $P_3$) observed at a depth position of an interface between the third liquid crystal immobilized layer 13*c* and the fourth liquid crystal immobilized layer 13*d* formed on the third liquid crystal immobilized layer 13*c*, and a peak (arrow $P_4$) observed at a depth position of an interface between the fourth liquid crystal immobilized layer 13*d* and the fifth liquid crystal immobilized layer 13*c* formed on the fourth liquid crystal immobilized layer 13*d*.

Here, the surfactant is likely to be unevenly distributed on the air interface side and the support interface side (particularly, the air interface side). Therefore, the secondary ion intensity derived from the surfactant is likely to be high in the vicinity of the one surface and the vicinity of the other surface. In order to eliminate this influence, in the obtained profile, in a case where a depth position corresponding to a thickness of 2/10 (20%) of the entire optically-anisotropic layer 12 from the one surface to the other surface side of the optically-anisotropic layer 12 is represented by a position D20 (refer to FIGS. 1 and 6) and a depth position corresponding to a thickness of 8/10 (80%) of the entire optically-anisotropic layer 12 is represented by a position D80 (refer to FIGS. 1 and 6), an average value of secondary ion intensities derived from the surfactant positioned between the position D20 and the position D80 is obtained, and a baseline is drawn at the average value. That is, an average value of secondary ion intensities derived from the surfactant in the region between the position D20 and the position D80 is calculated, a straight line representing the average value is drawn along the horizontal axis, and this straight line is set as the baseline.

Next, in the region between the position D20 and the position D80 of the profile, a maximal value representing a secondary ion intensity having a size of 1.1 times or more the average value obtained as described above is considered as a peak. In the present invention, in the profile, one or more peaks having a secondary ion intensity of 1.1 times or more the average value are observed, and the values of all the peaks are less than 5 times the average value.

The profile including the peak having a value of 1.1 times or more the average value represents that the optically-anisotropic layer 12 is formed by the multilayer application. As described above, in a case where the optically-anisotropic layer 12 is formed by forming the liquid crystal immobilized layer multiple times, the liquid crystal alignment pattern of the lower liquid crystal immobilized layer acts as the alignment film on the liquid crystal immobilized layer formed on the lower liquid crystal immobilized layer. Therefore, the liquid crystal compound is appropriately aligned in each of the liquid crystal immobilized layers, and the aligning properties as the entire optically-anisotropic layer are improved. In addition, as described above, in a case where the amount of uneven distribution of the surfactant at the interface between the liquid crystal immobilized layers is too small, that is, in a case where the value of the peak is less than 1.1 times the average value in the profile, smoothness and aligning properties cannot be ensured.

In addition, in the profile, the value of the peak being 5 times or more the average value represents that the amount of uneven distribution of the surfactant at the interface between the liquid crystal immobilized layers is too large. As described above, in a case where the amount of uneven distribution of the surfactant at the interface between the liquid crystal immobilized layers is too large, the smooth liquid crystal immobilized layer cannot be formed due to the occurrence of cissing during the formation of the next liquid crystal immobilized layer on the lower liquid crystal immobilized layer, and the aligning properties of the liquid crystal compound also deteriorate. On the other hand, in the present invention, the values of all the peaks in the profile being less than 5 times the average value represents that cissing is suppressed during the formation of the next liquid crystal immobilized layer on the lower liquid crystal immobilized layer, the smooth liquid crystal immobilized layer can be formed, and the aligning properties of the liquid crystal compound can be improved.

In the graph shown in FIG. 6, in the profile of Examples shown by the solid line, the values of all the peaks are less than 5 times the average value. On the other hand, in the profile of the example of the related art indicated by the chain line, the values of all the peaks are 5 times or more the average value.

In order to have the configuration where a peak that shows a secondary ion intensity having a size of 1.1 times or more the average value is observed and a peak that shows a secondary ion intensity having a size of 5 times or more the average value is not observed in the region from the position D20 to the position D80 of the profile of the secondary ion intensity derived from the surfactant of the optically-anisotropic layer 12, the kind and addition amount of the surfactant, the kind, ratio, and drying rate of a solvent, the hardness of a coating film, and the like in the liquid crystal composition for forming the optically-anisotropic layer may be appropriately adjusted.

Here, in the present invention, the birefringence Δn of the optically-anisotropic layer is 0.20 or more.

As described above, in order to obtain the action of transmitting and diffracting light by the optically anisotropic layer 12, the value of the product of the birefringence Δn of the liquid crystal compound 40 of the optically-anisotropic layer 12 and the thickness of the optically-anisotropic layer 12 needs to be λ/2. Therefore, by setting the birefringence Δn to be 0.20 or more, the thickness of the optically-anisotropic layer 12 can be reduced. As long as the thickness of the optically anisotropic layer 12 can be reduced, the number of the liquid crystal immobilized layers can be reduced in a case where the optically-anisotropic layer 12 is formed by the multilayer application. As described above, in the profile of the secondary ion intensity derived from the surfactant of the optically-anisotropic layer 12, the peaks of the secondary ion intensity are observed at the position of the interfaces between the liquid crystal immobilized layers. Therefore, in a case where the number of the liquid crystal immobilized layers is small, the number of the peaks of the secondary ion intensity in the above-described profile is small. In a case where the number of the liquid crystal immobilized layers is small, the number of times of application in the multilayer application can be reduced. Therefore, the aligning properties and the productivity can be improved.

<<Method of Measuring Δn>>

In the present specification, Δn can be measured as follows.

Δn×d of the optically-anisotropic layer is obtained by a birefringence measuring device. Further, by measuring the thickness d of a cross section with a cross-section cutting method, an interference film thickness meter, and the like, Δn can be calculated.

Here, in a case where Δn is excessively high, the coloration or light fastness of the coating film tends to deteriorate. Accordingly, Δn is preferably 0.40 or less.

In addition, from the viewpoint of aligning properties, the value of the peak of the secondary ion intensity in the profile is preferably 1.1 times to 4.5 times and more preferably 1.1 times to 1.8 times the average value.

In addition, in a case where a distance (distance in the depth direction) between two or more peaks adjacent to each other that show the secondary ion intensity having a size of 1.1 times or more the average value in the region between the position D20 and the position D80 is represented by T (nm), in other words, in a case where the thickness of one liquid crystal immobilized layer in the optically-anisotropic layer 12 formed by the multilayer application is represented by T (nm), it is preferable that the distance T between the peaks and the single period Λ (nm) of the liquid crystal alignment pattern of the optically-anisotropic layer 12 satisfy $$0.05 \leq T/\Lambda \leq 0.25.$$

As the single period Λ of the liquid crystal alignment pattern decreases, the aligning properties are likely to deteriorate. Therefore, it is preferable that the distance T between the peaks, that is, the thickness of the liquid crystal immobilized layer that is formed by performing the application once is small. Accordingly, from the viewpoint of aligning properties, T/Λ is preferably 0.25 or less, more preferably 0.23 or less, and still more preferably 0.20 or less.

On the other hand, in a case where the distance T between the peaks, that is, the thickness of the liquid crystal immobilized layer that is formed by performing the application once is excessively small, the number of the liquid crystal immobilized layers needs to be increased. Accordingly, from the viewpoint of productivity, T/Λ is preferably 0.05 or more, more preferably 0.08 or more, and still more preferably 0.10 or more.

From the viewpoints of aligning properties, productivity, and the like, the number of the peaks of the secondary ion intensity, that is, the number of the liquid crystal immobilized layers in the region between the position D20 and the position D80 of the profile is preferably 2 to 30, more preferably 4 to 25, and still more preferably 6 to 20.

In addition, in the example shown in FIG. 1, the thickness of the liquid crystal immobilized layer is fixed. However, the present invention is not limited to this example, and the thicknesses of the liquid crystal immobilized layers may be different from each other. In a case where the thicknesses of the liquid crystal immobilized layers are different from each other, that is, in a case where the distances between the peaks in the profile are different from each other, it is preferable that all the distances between the peaks satisfy $0.05 \leq T/\Lambda \leq 0.25$.

<<Method of Forming Optically-Anisotropic Layer>>

An optically-anisotropic layer can be formed by applying a liquid crystal composition including a liquid crystal compound to an alignment film for aligning the liquid crystal compound in a predetermined liquid crystal alignment pattern to form a liquid crystal phase that is aligned in the liquid crystal alignment pattern in which an orientation of an optical axis derived from the liquid crystal compound changes while continuously rotating in at least one in-plane direction, and immobilizing the liquid crystal phase in a layer shape.

As described above, in the present invention, the optically-anisotropic layer is formed by the multilayer application. The multilayer application refers to a method of forming the optically-anisotropic layer by repeating the following processes until a desired thickness is obtained, the processes including: forming a first liquid crystal immobilized layer by applying the liquid crystal composition for forming the first layer to the alignment film, heating the liquid crystal composition, cooling the liquid crystal composition, and irradiating the liquid crystal composition with ultraviolet light for curing; and forming a second or subsequent liquid crystal immobilized layer by applying the liquid crystal composition for forming the second or subsequent layer to the formed liquid crystal immobilized layer, heating the liquid crystal composition, cooling the liquid crystal composition, and irradiating the liquid crystal composition with ultraviolet light for curing as described above.

(Support)

As a support that supports the alignment film and the optically-anisotropic layer, various sheet-shaped materials (films or plate-shaped materials) can be used as long as they can support the alignment film and the optically-anisotropic layer.

A transmittance of the support with respect to light to be diffracted is preferably 50% or more, more preferably 70% or more, and still more preferably 85% or more.

The thickness of the support is not particularly limited and may be appropriately set depending on the use of the diffraction element, a material for forming the support, and the like in a range where the alignment film and the optically-anisotropic layer can be supported.

The thickness of the support is preferably in a range of 1 to 1000 μm, more preferably in a range of 3 to 250 μm, and still more preferably in a range of 5 to 150 μm. The support may have a monolayer structure or a multi-layer structure.

In a case where the support has a monolayer structure, examples thereof include supports formed of glass, triacetyl cellulose (TAC), polyethylene terephthalate (PET), polycarbonates, polyvinyl chloride, acryl, polyolefin, and the like. In a case where the support has a multi-layer structure, examples thereof include a support including: one of the above-described supports having a monolayer structure that is provided as a substrate; and another layer that is provided on a surface of the substrate.

(Alignment Film)

The alignment film is formed on the surface of the support.

The alignment film is an alignment film for aligning the liquid crystal compound 40 to the predetermined liquid crystal alignment pattern during the formation of the optically-anisotropic layer.

As described above, in the present invention, the optically-anisotropic layer has the liquid crystal alignment pattern in which the orientation of the optical axis 40A (refer to FIG. 3) derived from the liquid crystal compound 40 changes while continuously rotating in one in-plane direction. Accordingly, the alignment film is formed such that the optically-anisotropic layer can form the liquid crystal alignment pattern.

In the following description, "the orientation of the optical axis 40A rotates" will also be simply referred to as "the optical axis 40A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as @-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, a material for forming polyimide, polyvinyl alcohol, a polymer having a polymerizable group described in JP1997-152509A (JP-H9-152509A), or an alignment film 32 and the like described in JP2005-97377A, JP2005-99228A, and JP2005-128503A is preferable.

The alignment film can be suitably used as a so-called photo-alignment film obtained by irradiating a photo-alignment material with polarized light or non-polarized light. That is, a photo-alignment film that is formed by applying a photo-alignment material to the support is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a malcimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

A thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. Examples thereof include a method including: applying the alignment film to a surface of the support; drying the applied alignment film; and exposing the alignment film to laser light to form an alignment pattern.

Figure 7:
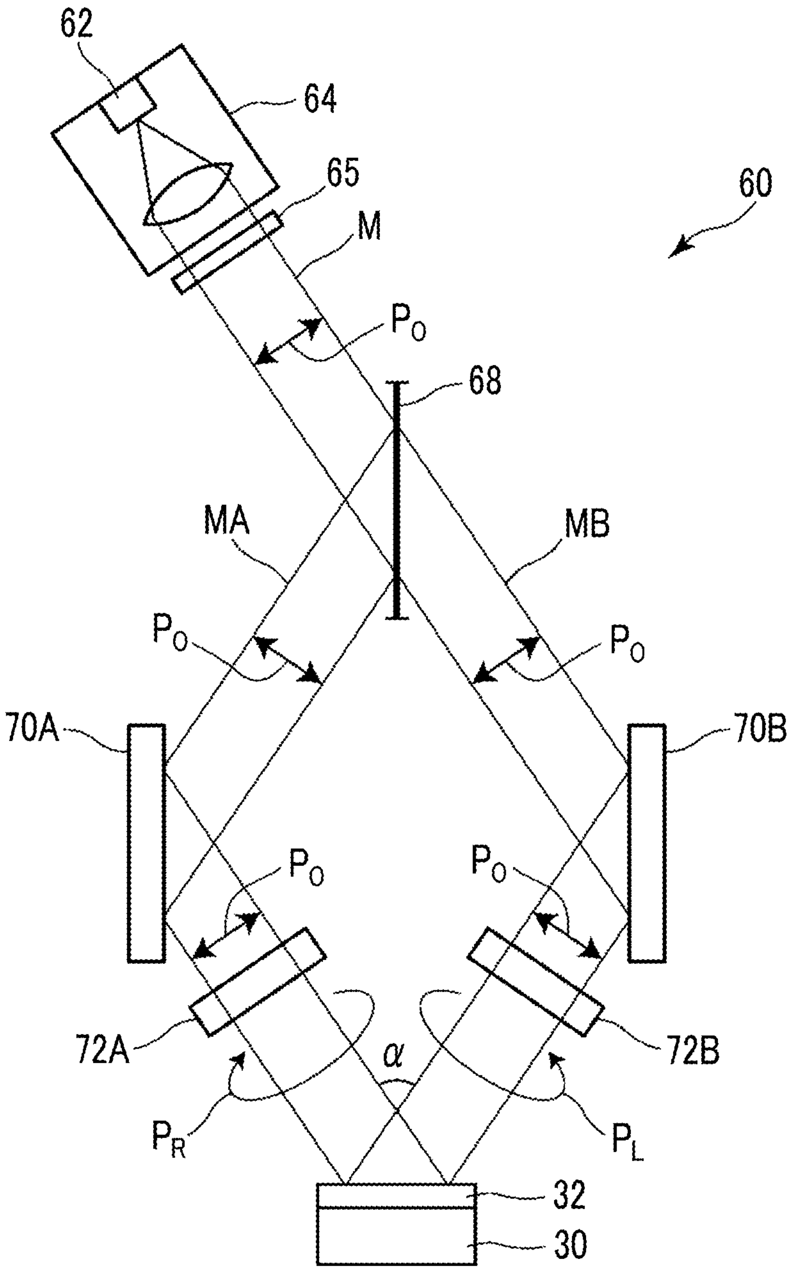
FIG. 7 is a diagram showing an example of an exposure device that forms an alignment pattern.

FIG. 7 conceptually shows an example of an exposure device that exposes the alignment film to form an alignment pattern.

An exposure device 60 shown in FIG. 7 includes: a light source 64 including a laser 62; an λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the split two beams MA and MB; and 24 plates 72A and 72B.

The light source 64 emits linearly polarized light $P_O$. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one direction in which the optical axis 40A rotates can be adjusted.

By forming the optically-anisotropic layer on the alignment film 32 having the alignment pattern in which the alignment state periodically changes, the optically-anisotropic layer having the liquid crystal alignment pattern in which the optical axis 40A derived from the liquid crystal compound 40 continuously rotates in the one direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the orientation of the optical axis of the liquid crystal compound in the optically-anisotropic layer formed on the patterned alignment film changes while continuously rotating in at least one in-plane direction. In a case where an axis along the orientation in which the liquid crystal compound is aligned is an alignment axis, it can be said that the patterned alignment film has an alignment pattern in which the orientation of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that an orientation in which the light amount is the maximum or the minimum gradually changes in the one in-plane direction.

In the present invention, the alignment film is provided as a preferable aspect and is not a configuration requirement.

For example, the following configuration can also be adopted, in which, by forming the alignment pattern on the support using a method of rubbing the support, a method of processing the support with laser light or the like, the optically-anisotropic layer has the liquid crystal alignment pattern in which the orientation of the optical axis 40A derived from the liquid crystal compound 40 changes while continuously rotating in at least one in-plane direction. That is, in the present invention, the support may be made to act as the alignment film.

(Formation of Optically-Anisotropic Layer)

The optically-anisotropic layer can be formed by immobilizing a liquid crystal phase in a layer shape, the liquid crystal phase being aligned in a liquid crystal alignment pattern in which an orientation of an optical axis derived from the liquid crystal compound changes while continuously rotating in at least one in-plane direction.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by aligning the polymerizable liquid crystal compound in the liquid crystal alignment pattern, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is sufficient as long as the optical characteristics of the liquid crystal phase are maintained, and the liquid crystal compound 40 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a liquid crystal phase include a liquid crystal composition including a liquid crystal compound. It is preferable that the liquid crystal compound is a polymerizable liquid crystal compound.

In addition, the liquid crystal composition used for forming the optically-anisotropic layer may further include a surfactant and a polymerization initiator.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming an optically-anisotropic layer include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane a compound, tolane compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. No. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where the two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

The kind of the liquid crystal compound is not particularly limited as long as it can be aligned in the liquid crystal alignment pattern in which an orientation of an optical axis derived from the liquid crystal compound changes while continuously rotating in at least one in-plane direction and can satisfy the range of Δn defined by the present invention. However, from the viewpoints of high Δn and a reduction in coloration, a tolane type liquid crystal compound and a thiotolane type liquid crystal compound can be suitably used. As the tolane type liquid crystal compound, a compound described in WO2019/182129A1 is preferable.

In addition, in order to further realize high Δn, a compound represented by Formula (I) below is preferable.

(I)

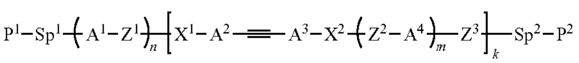

In Formula (I), $P^1$ and $P^2$ each independently represent a hydrogen atom, —CN, —NCS, or a polymerizable group.

$Sp^1$ and $Sp^2$ each independently represent a single bond or a divalent linking group. Here, $Sp^1$ and $Sp^2$ do not represent a divalent linking group including at least one group selected from the group consisting of an aromatic hydrocarbon ring group, an aromatic heterocyclic group, and an aliphatic hydrocarbon ring group. Examples of the above-described divalent linking group include an alkylene group, —O—, —S—, —$SO_2$—, —CO—, —NH—, and a group including a combination thereof (for example, -alkylene group-O—).

$Z^1$, $Z^2$, and $Z^3$ each independently represent a single bond, —O—, —S—, —CHR—, —CHRCHR—, —OCHR—, —CHRO—, —SO—, —$SO_2$—, —COO—, —OCO—, —CO—S—, —S—CO—, —O—CO—O—, —CO—NR—, —NR—CO—, —SCHR—, —CHRS—, —SO—CHR—, —CHR—SO—, —$SO_2$—CHR—, —CHR—$SO_2$—, —$CF_2$O—, —$OCF^2$—, —$CF_2$S—, —$SCF_2$—, —OCHRCHRO—, —SCHRCHRS—, —SO—CHRCHR—SO—, —$SO_2$—CHRCHR—$SO_2$—, —CH═CH—COO—, —CH═CH—OCO—, —COO—CH═CH—, —OCO—CH═CH—, —COO—CHRCHR—, —OCO—CHRCHR—, —CHRCHR—COO—, —CHRCHR—OCO—, —COO—CHR—, —OCO—CHR—, —CHR—COO—, —CHR—OCO—, —CR═CR—, —CR═N—, —N═CR—, —N═N—, —CR═N—N═CR—, —CF═CF—, or —C≡C—. R represents a hydrogen atom or an alkyl group having 1 to 10 carbon atoms. In a case where a plurality of R's are present, R's may be the same as or different from each other. In a case where a plurality of $Z^1$'s and a plurality of $Z^2$'s are present, $Z^1$'s and $Z^2$'s may be the same as or different from each other. In a case where a plurality of $Z^3$'s are present, $Z^3$'s may be the same as or different from each other. Here, $Z^3$ linked to $SP^2$ represents a single bond.

$X^1$ and $X^2$ each independently represent a single bond or —S—. In a case where a plurality of $X^1$'s and a plurality of $X^2$'s are present, $X^1$'s and $X^2$'s may be the same as or different from each other.

k represents an integer of 2 to 4.

m and n each independently represent an integer of 0 to 3. In a case where a plurality of m's are present, m's may be the same as or different from each other.

$A^1$, $A^2$, $A^3$, and $A^4$ each independently represent a group represented by any one of Formulas (B-1) to (B-7) or a group where two or three groups among the groups represented by Formulas (B-1) to (B-7) are linked. In a case where a plurality of $A^2$'s and a plurality of $A^3$'s are present, $A^2$'s and $A^3$'s may be the same as or different from each other. In a case where a plurality of $A^1$'s and a plurality of $A^4$'s are present, $A^1$'s and $A^4$'s may be the same as or different from each other.

(B-1)

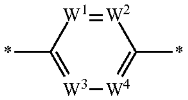

(B-2)

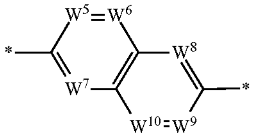

(B-3)

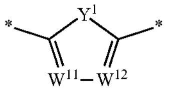

(B-4)

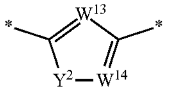

(B-5)

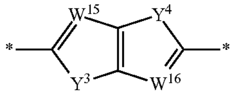

(B-6)

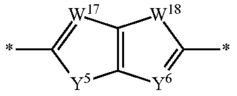

(B-7)

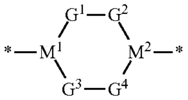

In Formulas (B-1) to (B-7), $W^1$ to $W^{18}$ each independently represent $CR^1$ or N, and $R^1$ represents a hydrogen atom or the following substituent L.

$Y^1$ to $Y^6$ each independently represent $NR^2$, O, or S, and $R^2$ represents a hydrogen atom or the following substituent L.

$G^1$ to $G^4$ each independently represent $CR^3R^4$, $NR^5$, O, or S, and $R^3$ to $R^5$ each independently represent a hydrogen atom or the following substituent L.

$M^1$ and $M^2$ each independently represent $CR^6$ or N, and $R^6$ represents a hydrogen atom or the following substituent L.

* represents a bonding position.

The substituent L represents an alkyl group having 1 to 10 carbon atoms, an alkoxy group having 1 to 10 carbon atoms, an alkylamino group having 1 to 10 carbon atoms, an alkylthio group having 1 to 10 carbon atoms, an alkanoyl group having 1 to 10 carbon atoms, an alkanoyloxy group having 1 to 10 carbon atoms, an alkanoylamino group having 1 to 10 carbon atoms, an alkanoylthio group having 1 to 10 carbon atoms, an alkyloxycarbonyl group having 2 to 10 carbon atoms, an alkylaminocarbonyl group having 2 to 10 carbon atoms, an alkylthiocarbonyl group having 2 to 10 carbon atoms, a hydroxy group, an amino group, a mercapto group, a carboxy group, a sulfo group, an amido group, a cyano group, a nitro group, a halogen atom, or a polymerizable group. Here, in a case where the group described as the substituent L has —$CH_2$—, a group in which at least one —$CH_2$— in the group is substituted with —O—, —CO—, —CH═CH—, or —C≡C— is also included in the substituent L. Here, in a case where the group described as the substituent L has a hydrogen atom, a group in which at least one hydrogen atom—in the group is substituted with at least one selected from the group consisting of a fluorine atom and a polymerizable group is also included in the substituent L.

—Surfactant—

In the present invention, the liquid crystal composition used for forming the optically-anisotropic layer may include a surfactant.

It is preferable that the surfactant is a compound that can function as an alignment control agent contributing to the stable or rapid alignment of the liquid crystal compound. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

It is preferable that the surfactant includes a fluorine atom and has a molecular weight of 800 to 2000.

In a case where the molecular weight of the surfactant is 800 or more, the surfactant activity power is high, the smoothness of the liquid crystal immobilized layer to be formed is improved, and the aligning properties are further improved. In addition, in a case where the molecular weight is 2000 or less, the surfactant is likely to be dissolved in the solvent during the lamination of the liquid crystal immobilized layers by the multilayer application for forming the optically-anisotropic layer. As a result, the amount of the surfactant at the interface is reduced, and the aligning properties are further improved. Accordingly, from the viewpoint of having the configuration where a peak that shows a secondary ion intensity having a size of 1.1 times or more the average value is observed and a peak that shows a secondary ion intensity having a size of 5 times or more the average value is not observed in the region from the position D20 to the position D80 of the profile of the secondary ion intensity derived from the surfactant of the optically-anisotropic layer 12 and the viewpoint of obtaining high aligning properties, the molecular weight of the surfactant is preferably 800 to 2000.

As the surfactant, a fluorine-based surfactant having a perfluoroalkyl group which may have an oxygen atom is also preferable. The molecular weight of the fluorine-based surfactant is preferably 800 to 2000 as described above.

The number of carbon atoms in the perfluoroalkyl group is not particularly limited, but is preferably 2 to 20 and more preferably 3 to 15.

In a case where the perfluoroalkyl group includes an oxygen atom, it is preferable that the oxygen atom is included as —O— (ether group). In a case where the perfluoroalkyl group includes an oxygen atom, the number of oxygen atoms is not particularly limited, and is preferably 2 to 4.

The number of the perfluoroalkyl groups in the fluorine-based surfactant is not particularly limited, and is preferably 1 to 6 and more preferably 1 to 4.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an α-carbonyl compound (described in U.S. Pat. No. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. No. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl(meth)acrylate or ethylene glycol diglycidyl an ether; aziridine compound such as 2,2-bis hydroxymethyl butanol-tris [3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

It is preferable that the liquid crystal composition is used as a liquid during the formation of the optically-anisotropic layer (during the application to the alignment film).

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

Here, from the viewpoint of having the configuration where a peak that shows a secondary ion intensity having a size of 1.1 times or more the average value is observed and a peak that shows a secondary ion intensity having a size of 5 times or more the average value is not observed in the region from the position D20 to the position D80 of the profile of the secondary ion intensity derived from the surfactant of the optically-anisotropic layer 12 and the viewpoint of obtaining high aligning properties, as the solvent in the liquid crystal composition, a ketone is preferable, and a combination of two or more ketones is preferable.

In addition, in a case where the ratio of the solvent in the liquid crystal composition is excessively large, a load of drying increases, and the productivity may decrease. On the other hand, in a case where the ratio of the solvent is too small, the uniformity of application deteriorates. Accordingly, from the viewpoint of aligning properties, the ratio of the solvent in the liquid crystal composition is preferably 50% to 98%, more preferably 60% to 96%, and still more preferably 70% to 94%.

In a case where the optically-anisotropic layer is formed, it is preferable that the optically-anisotropic layer (liquid crystal immobilized layer) is formed by applying the liquid crystal composition to a surface where the optically-anisotropic layer is to be formed, aligning the liquid crystal compound to a state the liquid crystal phase aligned in the predetermined liquid crystal alignment pattern, and curing the liquid crystal compound.

That is, in a case where the optically-anisotropic layer is formed on the alignment film, it is preferable that the optically-anisotropic layer obtained by immobilizing a liquid crystal phase is formed by applying the liquid crystal composition to the alignment film, aligning the liquid crystal compound in the predetermined liquid crystal alignment pattern, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the optically-anisotropic layer. In the drying and/or heating step, the liquid crystal compound in the liquid crystal composition only has to be aligned in the predetermined liquid crystal alignment pattern. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 $mJ/cm^2$ to 50 $J/cm^2$ and more preferably 50 to 1500 $mJ/cm^2$. In order to promote a photopolymerization reaction, light irradiation may be performed under heating conditions or in a nitrogen atmosphere. The wavelength of irradiated ultraviolet light is preferably 250 to 430 nm.

As described above, the optically-anisotropic layer is formed with a desired thickness by the multilayer application where the operations including the application to the polymerization are repeated. In this case, the liquid crystal compound in the liquid crystal composition applied to the lower liquid crystal immobilized layer is aligned in the same liquid crystal alignment pattern as the liquid crystal alignment pattern on the surface of the lower liquid crystal immobilization layer. That is, in a case where the optically-anisotropic layer is formed by the multilayer application, the lower liquid crystal immobilized layer acts as the alignment film of the upper liquid crystal immobilized layer.

Here, in the optically-anisotropic layer shown in FIG. 2, the optical axes of the liquid crystal compounds arranged in the thickness direction are aligned in the same direction. However, the present invention is not limited to this configuration. The optically-anisotropic layer may have a region where the optical axis of the liquid crystal compound is twisted in the thickness direction in a plane. In this case, in the region including the twisted structure in the thickness direction, a twisted angle over the entire area in the thickness direction is 10° to 360°.

Figure 8:
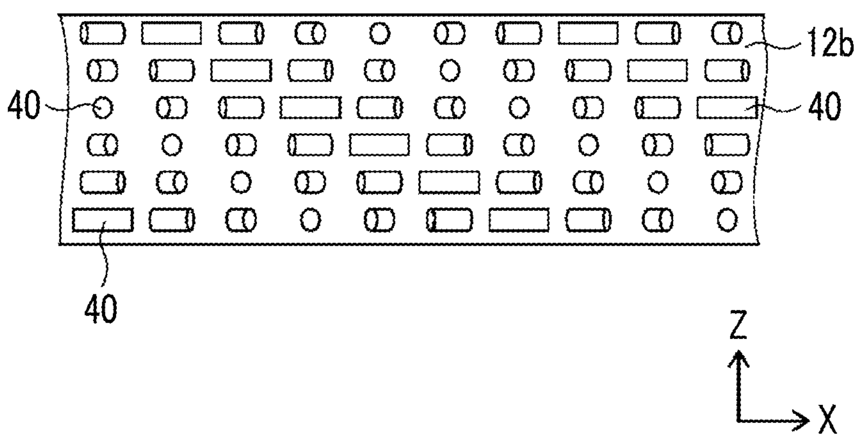
FIG. 8 is a conceptual diagram showing another example of the optically-anisotropic layer in the diffraction element according to the present invention.

FIG. 8 is a diagram conceptually showing another example of the optically-anisotropic layer in the diffraction element according to the embodiment of the present invention.

An optically-anisotropic layer 12*b* shown in FIG. 8 has the same configuration as the optically-anisotropic layer shown in FIGS. 2 and 3, except that the liquid crystal compound is twisted and aligned in the thickness direction. That is, in a case where the optically-anisotropic layer 12*b* shown in FIG. 8 is seen from the thickness direction, as in the example shown in FIG. 3, the optically-anisotropic layer 12*b* has a liquid crystal alignment pattern in which the orientation of the optical axis 40A changes while continuously rotating along the arrangement axis D in a plane.

The optically-anisotropic layer 12*b* shown in FIG. 8 has a twisted structure in which the liquid crystal compound 40 is turned and laminated in the thickness direction, and a total rotation angle between the liquid crystal compound 40 present on one main surface side of the optically-anisotropic layer 12*b* and the liquid crystal compound 40 present on another main surface side of the optically-anisotropic layer 12*b* is 360° or less.

This way, in a case where the optically-anisotropic layer has the liquid crystal alignment pattern where the orientation of the optical axis 40A changes while continuously rotating along the arrangement axis D in a plane and has the structure where the liquid crystal compound 40 is twisted in the thickness direction, in a cross section parallel to the arrangement axis D, a line segment that connect the liquid crystal compounds 40 facing the same direction in the thickness direction is tilted with respect to the main surface of the optically-anisotropic layer. In an image obtained by observing a cross-section of the optically-anisotropic layer taken in the thickness direction along the arrangement axis D with a scanning electron microscope (SEM), a stripe pattern of bright portions and dark portions to be observed is tilted with respect to the main surface. As a result, the diffraction efficiency of the diffraction element can be further improved.

This way, in order for the optically-anisotropic layer to have the configuration where the liquid crystal compound is twisted and aligned in the thickness direction, the liquid crystal composition for forming the optically-anisotropic layer may include a chiral agent.

—Chiral Agent (Optically Active Compound)—

The chiral agent has a function of causing a helical structure of a liquid crystal phase to be formed. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after application and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

In addition, the optically-anisotropic layer may be configured to include regions where twisted states (twisted angles and twisted directions) are different in the thickness direction. In this configuration, in a cross sectional image obtained by observing a cross section of the optically-anisotropic layer taken in the thickness direction along the one direction in which the orientation of the optical axis of the liquid crystal compound changes while continuously rotating with a scanning electron microscope, a bright portion and a dark portion extending from one main surface to another main surface are observed, and the dark portion has one or two or more inflection points of angle.

Figure 9:
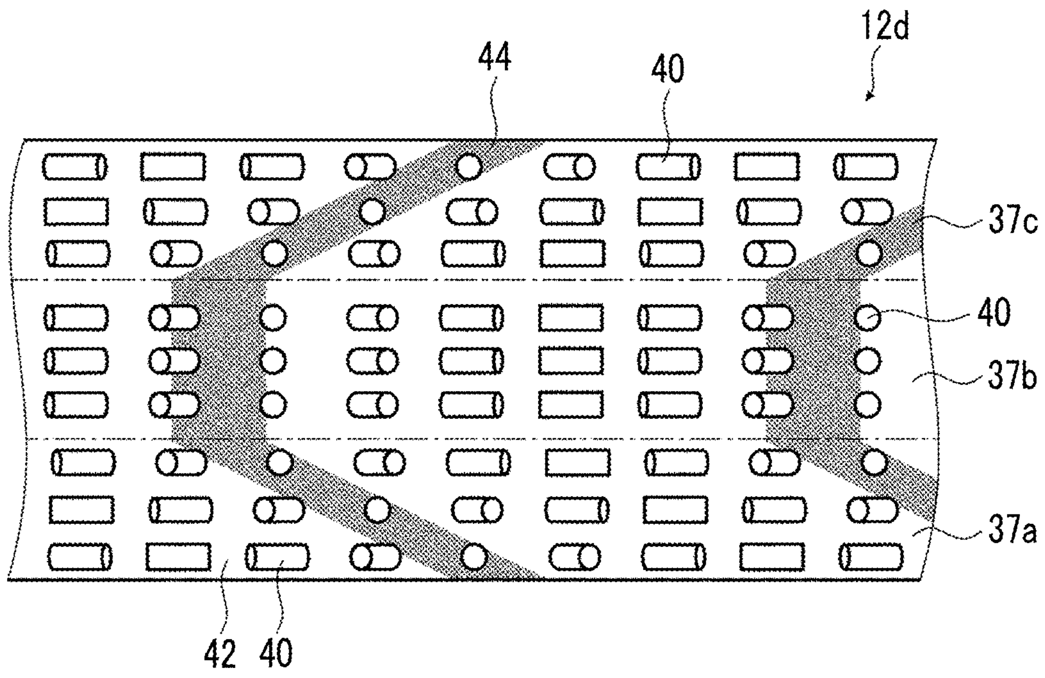
FIG. 9 is a conceptual diagram showing another example of the optically-anisotropic layer in the diffraction element according to the present invention.

FIG. 9 shows an example of the optically-anisotropic layer. In FIG. 9, bright portions 42 and dark portions 44 are shown to overlap a cross section of an optically-anisotropic layer 12*d*. In the following description, the image obtained by observing the cross section taken in the thickness direction along the one direction in which the optical axis rotates with an SEM will also be simply referred to as "cross-sectional SEM image".

In the cross-sectional SEM image of the optically-anisotropic layer 12*d* shown in FIG. 9, the dark portion 44 has two inflection points where the angle changes. That is, the optically-anisotropic layer 12*d* can also include three regions including a region 37*a*, a region 37*b*, and a region 37*c* corresponding to the inflection points of the dark portion 44 in the thickness direction.

The optically-anisotropic layer 12*d* also has, at any position in the thickness direction, the liquid crystal alignment pattern where the optical axis derived from the liquid crystal compound 40 rotates clockwise to the left direction in the drawing in the in-plane direction in a view from the top in the drawing. In addition, the single period of the liquid crystal alignment pattern is fixed in the thickness direction.

In addition, as shown in FIG. 9, in the lower region 37*a* in the thickness direction, the liquid crystal compound 40 is twisted and aligned to be helically twisted clockwise (to the right) from the upper side to the lower side in the drawing in the thickness direction.

In the middle region 37*b* in the thickness direction, the liquid crystal compound 40 is not twisted in the thickness direction, and the optical axes of the liquid crystal compounds 40 laminated in the thickness direction face the same direction. That is, the optical axes of the liquid crystal compounds 40 present at the same position in the in-plane direction face the same direction.

In the upper region 37*c* in the thickness direction, the liquid crystal compound 40 is twisted and aligned to be helically twisted counterclockwise (to the left) from the upper side to the lower side in the drawing in the thickness direction.

That is, in the region 37*a*, the region 37*b*, and the region 37*c* of the optically-anisotropic layer 12*d* shown in FIG. 9, the twisted states of the liquid crystal compounds 40 in the thickness direction are different from each other.

In the optically-anisotropic layer having the liquid crystal alignment pattern in which the optical axis derived from the liquid crystal compound continuously rotates in the one direction, the bright portions and the dark portions in the cross-sectional SEM image of the optically-anisotropic layer are observed to connect the liquid crystal compounds facing the same orientation.

For example, in FIG. 9, the dark portions 44 are observed to connect the liquid crystal compounds 40 of which the optical axes face a direction orthogonal to the paper plane.

In the lowermost region 37*a* in the thickness direction, the dark portion 44 is tilted to the upper left side in the drawing. In the middle region 37*b*, the dark portion 44 extends in the thickness direction. In the uppermost region 37*c*, the dark portion 44 is tilted to the upper right side in the drawing.

That is, the optically-anisotropic layer 12*d* shown in FIG. 9 has two inflection points of angle where the angle of the dark portion 44 changes. In addition, in the uppermost region 37*c*, the dark portion 44 is tilted to the upper right side. In the lowermost region 37*b*, the dark portion 44 is tilted to the upper left side. That is, in the region 37*c* and the region 37*a*, the tilt directions of the dark portions 44 are different from each other.

Further, the optically-anisotropic layer 12*d* shown in FIG. 9 has one inflection point where the dark portion 44 is folded in a direction opposite to the tilt direction.

Specifically, regarding the dark portion 44 of the optically-anisotropic layer 12*d*, the tilt direction in the region 37*c* and the tilt direction in the region 37*b* are opposite to each other. Therefore, at the inflection point positioned at the interface between the region 37*c* and the region 37*b*, the tilt direction is folded in the opposite direction. That is, the optically-anisotropic layer 12*d* has one inflection point where the tilt direction is folded in the opposite direction.

In addition, in the region 37*c* and the region 37*a* of the optically-anisotropic layer 12*d*, for example, the thicknesses are the same, and the twisted states of the liquid crystal compounds 40 in the thickness direction are different from each other. Therefore, as shown in FIG. 9, the bright portions 42 and the dark portions 44 in the cross-sectional SEM image are formed in a substantially C-shape.

Accordingly, in the optically-anisotropic layer 12*d*, the shape of the dark portion 44 is symmetrical with respect to the center line in the thickness direction.

In the optically-anisotropic layer 12*d*, that is, in the optically-anisotropic layer 12 where the cross-sectional SEM image has the bright portions 42 and the dark portions 44 extending from one surface to another surface and each of the dark portions 44 has one or two or more inflection points of angle, the wavelength dependence of the diffraction efficiency can be reduced, and light can be diffracted with the same diffraction efficiency irrespective of wavelengths.

In the example shown in FIG. 9, the dark portion 44 is configured to have two inflection points of angle. However, the present invention is not limited to this configuration, and the dark portion 44 may have one inflection point of angle or may have three or more inflection points of angle. For example, in the configuration where the dark portion 44 of the optically-anisotropic layer has one inflection point of angle, for example, the optically-anisotropic layer may consist of the region 37*c* and the region 37*a* shown in FIG. 9, may consist of the region 37*c* and the region 37*b*, or may consist of the region 37*b* and the region 37*a*. Alternatively, in the configuration where the dark portion 44 of the optically-anisotropic layer has three inflection points of angle, the region 37*c* and the region 37*a* shown in FIG. 9 may be alternately provided two by two.

In the present invention, even in the configuration where the optically-anisotropic layer 12*d* includes the regions where the twisted states are different in the thickness direction, in a case where components of the optically-anisotropic layer 12 in a depth direction are analyzed by time-of-flight secondary ion mass spectrometry while irradiating the optically-anisotropic layer with an ion beam from one surface to another surface of the optically-anisotropic layer 12, a depth-direction profile of a secondary ion intensity derived from the surfactant is obtained, a depth position corresponding to a thickness of 20% from the one surface to the other surface side of the optically-anisotropic layer 12 is represented by a position D20, a depth position corresponding to a thickness of 80% from the one surface to the other surface side of the optically-anisotropic layer 12 is represented by a position D80, and an average value of secondary ion intensities derived from the surfactant between the position D20 and the position D80 is calculated, in a region from the position D20 to the position D80, a peak that shows a secondary ion intensity having a size of 1.1 times or more the average value is observed and a peak that shows a secondary ion intensity having a size of 5 times or more the average value is not observed.

Figure 10:
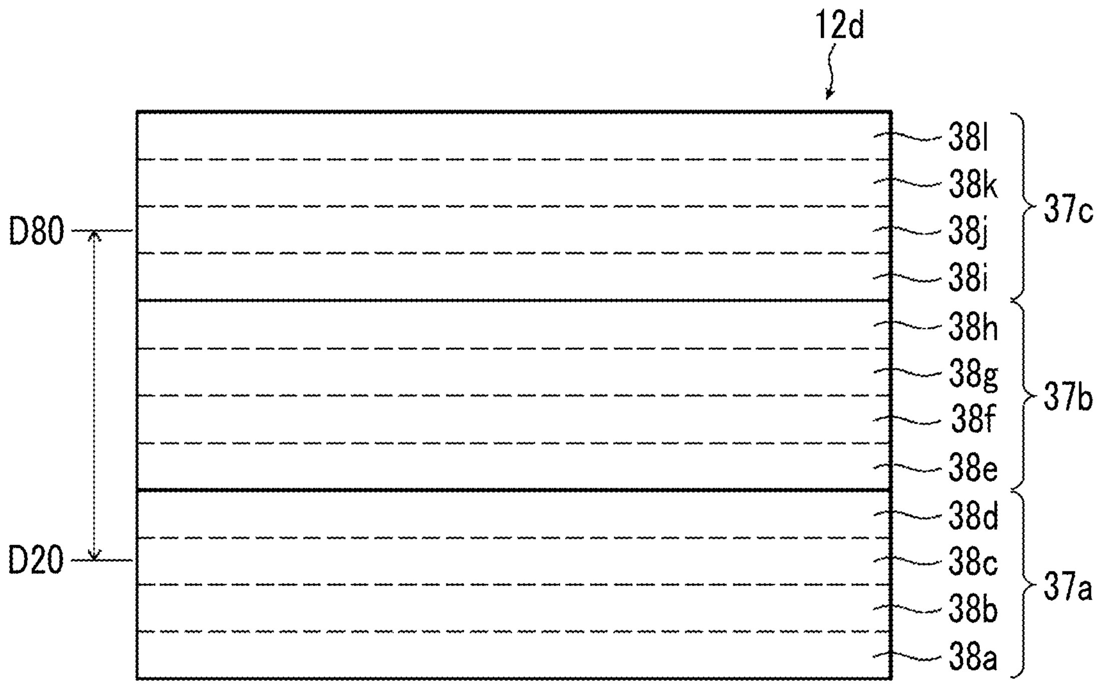
FIG. 10 is a diagram conceptually showing a configuration of the optically-anisotropic layer shown in FIG. 9.

As shown in FIG. 10, even in the configuration where the optically-anisotropic layer 12*d* includes the regions where the twisted states are different in the thickness direction, each of the regions (37*a*, 37*b*, 37*c*) is formed by the multilayer application. In the example shown in FIG. 10, the region 37*a* consists of four liquid crystal immobilized layers 38*a* to 38*d*, the region 37*b* consists of four liquid crystal immobilized layers 38*e* to 38*h*, and the region 37*c* consists of four liquid crystal immobilized layers 38*i* to 38*l*. For example, in a case where the optically-anisotropic layer 12*d* is formed by the multilayer application on the alignment film on the support from the region 37*a* side, the liquid crystal composition for forming the region 37*a* is applied to the alignment film and is heated and cured to form the first liquid crystal immobilized layer 38*a*. Next, the second to fourth liquid crystal immobilized layers 38*b* to 38*d* are formed on the first liquid crystal immobilized layer 38*a* to form the region 37*a*. Next, the liquid crystal composition for forming the region 37*b* is applied to the fourth liquid crystal immobilized layer 38*d* of the region 37*a* and is heated and cured to form the first liquid crystal immobilized layer 38*e* of the region 37*b*. Further, the second to fourth liquid crystal immobilized layers 38*f* to 38*h* of the region 37*b* are formed on the first liquid crystal immobilized layer 38*e* to form the region 37*b*. Next, the liquid crystal composition for forming the region 37*c* is applied to the fourth liquid crystal immobilized layer 38*h* of the region 37*b* and is heated and cured to form the first liquid crystal immobilized layer 38*i* of the region 37*c*. Further, the second to fourth liquid crystal immobilized layers 38*j* to 38*l* of the region 37*c* are formed on the first liquid crystal immobilized layer 38*i* to form the region 37*c*.

Even in the configuration where the optically-anisotropic layer 12*d* includes the regions where the twisted states are different in the thickness direction, all the liquid crystal immobilized layers are formed by the multilayer application. Therefore, in a case where a profile of a secondary ion intensity derived from the surfactant of the optically-anisotropic layer 12*d* is acquired, peaks of the secondary ion intensity are observed at depth positions of interfaces between the liquid crystal immobilized layers of each of the regions and interfaces between the regions (an interface between the liquid crystal immobilized layer 38*d* of the region 37*a* and the liquid crystal immobilized layer 38*e* of the region 37*b* and an interface between the liquid crystal immobilized layer 38*h* of the region 37*b* and the liquid crystal immobilized layer 38*i* of the region 37*c*).

In the present invention, even in this configuration, the size of a peak of the secondary ion intensity in the region between the position D20 and the position D80 of the profile is 1.1 times or more the average value, and a peak having a size of 5 times or more the average value is not observed. As a result, the aligning properties can be improved.

In the example shown in FIG. 10, as the peak present in the region between the position D20 and the position D80, peaks from the peak at the depth position of the interface between the liquid crystal immobilized layer 38*c* and the liquid crystal immobilized layer 38*d* to the peak at the depth position of the interface between the liquid crystal immobilized layer 38*i* and the liquid crystal immobilized layer 38*j* are observed.

In the example shown in FIG. 10, the configuration where each of the regions consists of four liquid crystal immobilized layers is adopted. However, the present invention is not limited to this configuration. Each of the regions may consist of two, three, or five or more liquid crystal immobilized layers. In addition, the numbers of the liquid crystal immobilized layers forming the respective regions may be the same as each other but may vary depending on the regions without being limited thereto.

In addition, in the liquid crystal alignment pattern of the optically-anisotropic layer shown in FIG. 3, the arrangement axis D is present in the one in-plane direction, and the optical axis 40A of the liquid crystal compound 40 continuously rotates in the one direction along the arrangement axis D direction.

However, the present invention is not limited thereto, and various configurations can be used as long as the optical axis 40A of the liquid crystal compound 40 in the optically-anisotropic layer continuously rotates in the one direction.

Figure 11:
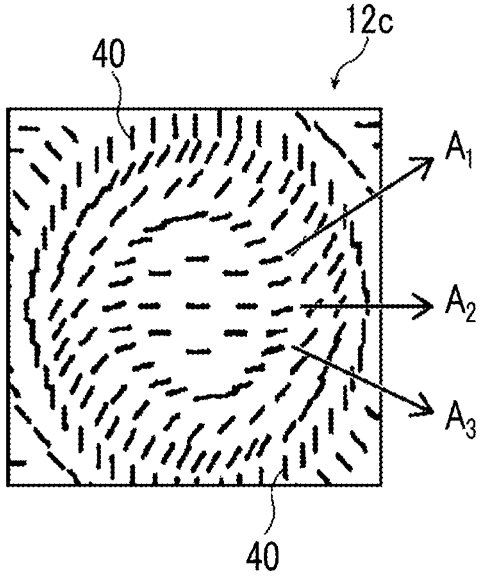
FIG. 11 is a plan view conceptually showing another example of the optically-anisotropic layer in the diffraction element according to the present invention.

For example, as conceptually shown in a plan view of FIG. 11, an optically-anisotropic layer 12*c* may be configured to include the liquid crystal alignment pattern in a radial shape. In the optically-anisotropic layer 12*c* shown in FIG. 11, the orientation of the optical axis of the liquid crystal compound 40 changes while continuously rotating in a plurality of directions from the center toward the outer side of the optically-anisotropic layer 12*c*, for example, a direction indicated by an arrow $A_1$, a direction indicated by an arrow $A_2$, a direction indicated by an arrow $A_3$, or . . . . That is, the arrows $A_1$, $A_2$, and $A_3$ are arrangement axes.

In addition, as shown in FIG. 11, the optical axis of the liquid crystal compound 40 changes while rotating in the same direction from the center toward the outer side of the optically-anisotropic layer 12*c*. In the aspect shown in FIG. 11, counterclockwise alignment is shown. The rotation directions in which the optical axes rotate and change along the respective arrows $A_1$, $A_2$, and $A_3$ in FIG. 11 are counterclockwise from the center toward the outer side.

In the radial liquid crystal alignment pattern, a line that connects liquid crystal compounds of which optical axes face the same direction has a circular shape, and a circular line segment is a concentric circular pattern.

In the optically-anisotropic layer 12*c* having the radial liquid crystal alignment pattern, in a case where incident light is diffracted along each of the arrangement axes (for example, $A_1$ to $A_3$) such that an azimuth direction faces the center side, transmitted light can be collected. Alternatively, in a case where incident light is diffracted along each of the arrangement axes (for example, $A_1$ to $A_3$) such that an azimuth direction faces the outer side, transmitted light can be diffused. Whether or not transmitted light is diffracted toward the center side or toward the outer side depends on the polarization state of the incident light and the rotation direction of the optical axis in the liquid crystal alignment pattern.

This way, in the present invention, by setting the liquid crystal alignment pattern of the optically-anisotropic layer to the radial pattern, a lens that collects or diffuses light can be obtained.

In a case where the diffraction element is used as the lens, it is preferable that the diffraction angle gradually increases from the center toward the outer side of the diffraction element. As a result, the diffraction element can collect or diffuse light more suitably.

Figure 12:
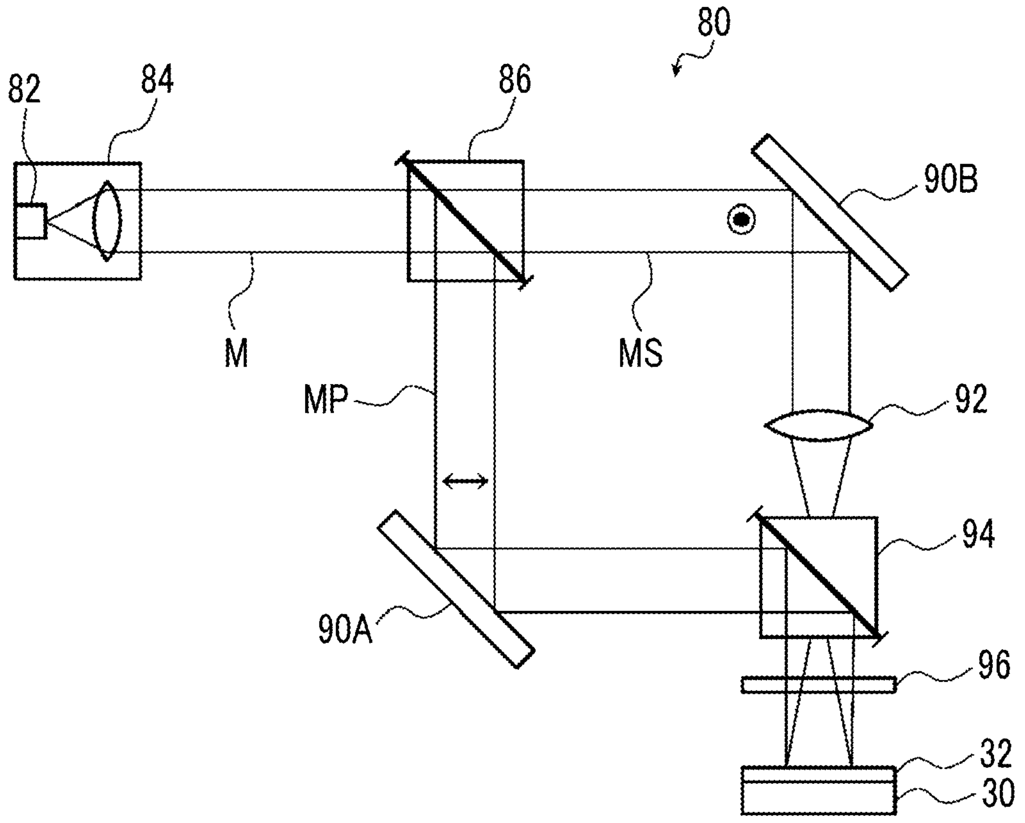
FIG. 12 is a diagram showing another example of the exposure device that forms the alignment pattern.

In addition, FIG. 12 shows an example of an exposure device that forms the radial liquid crystal alignment pattern shown in FIG. 11.

An exposure device 80 shown in FIG. 12 includes: a light source 84 that includes a laser 82; a polarization beam splitter 86 that splits the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are combined by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film 32 is irradiated periodically changes according to interference fringes. The intersecting angle between the right circularly polarized light and the left circularly polarized light changes from the inner side to the outer side of the concentric circle. Therefore, an exposure pattern in which the period changes from the inner side to the outer side can be obtained. As a result, in the alignment film 32, the radial alignment pattern in which the alignment state periodically changes can be obtained.

In the exposure device 80, the length Λ of the single period in the liquid crystal alignment pattern in which the optical axis of the liquid crystal compound 40 continuously rotates by 180° can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one direction in which the optical axis continuously rotates can be changed. Specifically, the length Λ of the single period in the liquid crystal alignment pattern in the one direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length A of the single period in the liquid crystal alignment pattern gradually decreases from the inner side toward the outer side, and the F number increases. Conversely, in a case where the refractive power of the lens 92 becomes stronger, the length A of the single period in the liquid crystal alignment pattern rapidly decreases from the inner side toward the outer side, and the F number decreases.

EXAMPLES

Hereinafter, the characteristics of the present invention will be described in detail using Examples and Comparative Examples. Materials, used amounts, ratios, treatment details, treatment procedures, and the like shown in the following Examples can be appropriately changed within a range not departing from the scope of the present invention. Accordingly, the scope of the present invention is not limited to the following specific examples.

Example 1

(Formation of Alignment Film)

The following coating liquid for forming an alignment film was continuously applied to a glass substrate having a thickness of 1.1 mm formed using a #2 wire bar. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

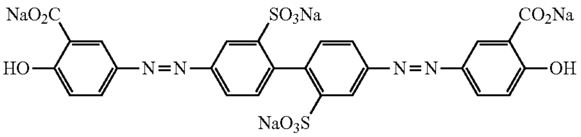

Material A for Photo-Alignment (Exposure of Alignment Film)

The alignment film was exposed using the exposure device shown in FIG. 7 to form an alignment film P-1 having an alignment pattern.

In the exposure device, a laser that emits laser light having a wavelength (355 nm) was used as the laser. The exposure amount of the interference light was 100 mJ/cm$^2$.

(Formation of Optically-Anisotropic Layer)

As the optically-anisotropic layer, an optically-anisotropic layer having three regions where twisted angles were different as shown in FIGS. 9 and 10 was formed.

As liquid crystal compositions for forming a first region (hereinafter, also referred to as a ZA layer), a second region (hereinafter, also referred to as a ZB layer), and a third region (hereinafter, also referred to as a ZC layer) of the optically-anisotropic layer, the following compositions ZA-1, ZB-1, and ZC-1 were prepared, respectively. The compositions ZA-1, ZB-1, and ZC-1 include 50 mass % of methyl ethyl ketone (MEK)+50 mass % of cyclopentanone (CPO) as a solvent such that the following concentration of solid contents was 3 mass %.

Composition ZA-1 (Solid Content)

Liquid crystal compound L-1 . . . 90.00 parts by mass

Liquid crystal compound L-2 . . . 10.00 parts by mass

Chiral agent K-1 having the following structure . . . 0.61 parts by mass

Polymerization initiator (IRGACURE (registered trade name) OXE01, manufactured by BASF SE) . . . 2.00 parts by mass Surfactant T-2 . . . 0.80 parts by mass

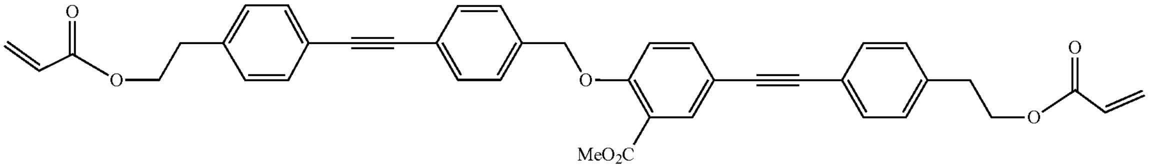

Liquid Crystal Compound L-1

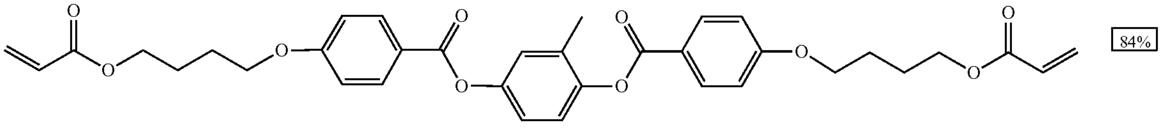

Liquid Crystal Compound L-2

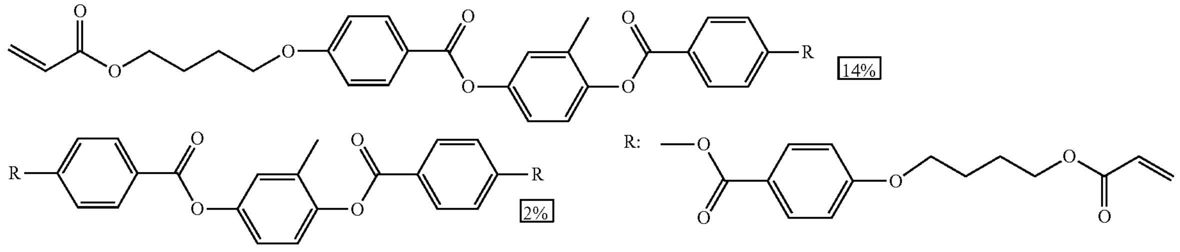

-continued

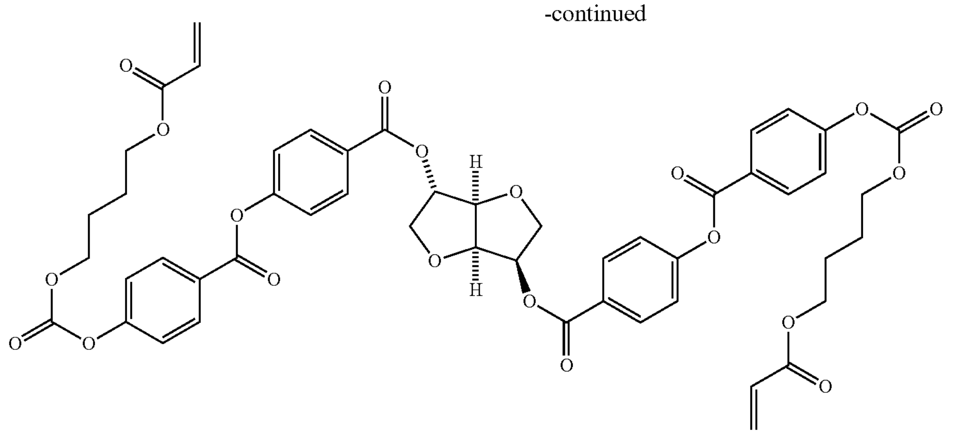

Chiral Agent K-1

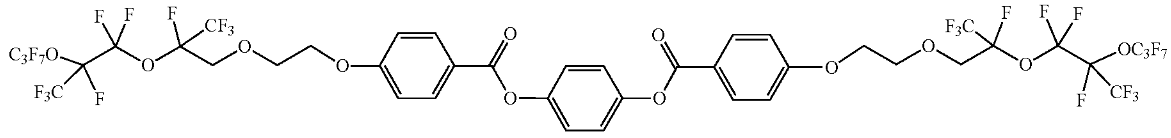

Surfactant T-2

The molecular weight of the surfactant T-2 was 1367.

Composition ZB-1 (Solid Content)

Liquid crystal compound L-1 . . . 90.00 parts by mass

Liquid crystal compound L-2 . . . 10.00 parts by mass

Chiral agent K-1 . . . 0.18 parts by mass

Chiral agent K-2 . . . having the following structure 0.19 parts by mass

Polymerization initiator (IRGACURE OXE01, manufactured by BASF SE) . . . 2.00 parts by mass Surfactant T-2 . . . 0.80 parts by mass

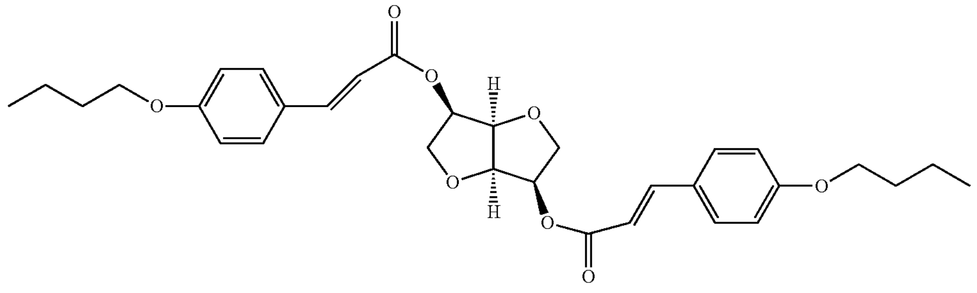

Chiral Agent K-2

Composition ZC-1 (Solid Content)

Liquid crystal compound L-1 . . . 90.00 parts by mass

Liquid crystal compound L-2 . . . 10.00 parts by mass

Chiral agent K-2 . . . 0.69 parts by mass

Polymerization initiator (IRGACURE OXE01, manufactured by BASF SE) . . . 2.00 parts by mass Surfactant T-2 . . . 0.80 parts by mass First, a first region (ZA layer) was formed by applying multiple layers of the composition ZA-1 to the alignment film P-1. The application of the multiple layers refers to repetition of the following processes including: preparing a first liquid crystal immobilized layer by applying the first layer-forming composition ZA-1 to the formation surface, heating the composition ZA-1, cooling the composition ZA-1, and irradiating the composition ZA-1 with ultraviolet light for curing; and preparing a second or subsequent liquid crystal immobilized layer by applying the second or subsequent layer-forming composition ZA-1 to the formed liquid crystal immobilized layer, heating the composition ZA-1, cooling the composition ZA-1, and irradiating the composition ZA-1 with ultraviolet light for curing as described above. Even in a case where the liquid crystal layer was formed by the multilayer application such that the total thickness of the optically-anisotropic layer was large, the alignment direction of the alignment film was reflected from a lower surface of the optically-anisotropic layer to an upper surface thereof.

First, the composition ZA-1 was applied to the alignment film P-1, and the coating film was heated to 80° C. on a hot plate. Next, the coating film was irradiated with ultraviolet light having a wavelength of 365 nm using a light emitting diode (LED)-ultraviolet (UV) exposure device. Next, the coating film heated on a hot plate at 80° C. was irradiated with ultraviolet light having a wavelength of 365 nm at an irradiation dose of 300 mJ/$cm^2$ using a high pressure mercury lamp in a nitrogen atmosphere. As a result, the alignment of the liquid crystal compound was immobilized, and the first liquid crystal immobilized layer of the ZA layer of the optically-anisotropic layer was formed. The thickness of the liquid crystal immobilized layer was 0.16 μm.

Regarding the second or subsequent liquid crystal layer, the composition was applied to the liquid crystal immobilized layer, and then a liquid crystal immobilized layer was prepared under the same conditions as described above. This way, by repeating the application multiple times, the ZA layer consisting of four liquid crystal immobilized layers was formed.

It was verified with a polarization microscope that the ZA layer was in a periodic alignment state where the single period over which the optical axis of the liquid crystal compound rotated by 180° was 1.0 μm. The twisted angle in the thickness direction of the ZA layer was left-twisted and) 80° (−80°).

Next, the ZB layer was formed by applying multiple layers of the composition ZB-1 to the ZA layer.

The first liquid crystal immobilized layer of the ZB layer was formed in the same procedure as that of the preparation procedure of the ZA layer, except that except that the composition ZB-1 was applied to the ZA layer and the irradiation dose of ultraviolet light with which the coating film was irradiated was changed.

Regarding the second or subsequent liquid crystal layer, the composition was applied to the liquid crystal immobilized layer, and then a liquid crystal immobilized layer was prepared under the same conditions as described above. This way, by repeating the application multiple times, the ZB layer consisting of nine liquid crystal immobilized layers was formed.

It was verified with a polarization microscope that the ZB layer was in a periodic alignment state where the single period over which the optical axis of the liquid crystal compound rotated by 180° was 1.0 μm. The twisted angle in the thickness direction of the ZB layer was right-twisted and) 4° (−4°.

Next, the ZC layer was formed by applying multiple layers of the composition ZC-1 to the ZB layer.

The first liquid crystal immobilized layer of the ZC layer was formed in the same procedure as that of the preparation procedure of the ZA layer, except that except that the composition ZC-1 was applied to the ZB layer and the irradiation dose of ultraviolet light with which the coating film was irradiated was changed.

Regarding the second or subsequent liquid crystal layer, the composition was applied to the liquid crystal immobilized layer, and then a liquid crystal immobilized layer was prepared under the same conditions as described above. This way, by repeating the application multiple times, the ZC layer consisting of four liquid crystal immobilized layers was formed.

It was verified with a polarization microscope that the ZC layer was in a periodic alignment state where the single period over which the optical axis of the liquid crystal compound rotated by 180° was 1.0 μm. In addition, the twisted angle of the ZC layer in the thickness direction was right-twisted and 80° (twisted angle: 80°).

This way, an optically-anisotropic layer having three regions where twisted angles were different in the thickness direction was formed.

The total thickness of the optically-anisotropic layer was 2.72 μm.

In addition, in a case where Δn of the optically-anisotropic layer was measured using the above-described method, Δn was 0.24.

In addition, a depth-direction profile of a secondary ion intensity derived from the surfactant of the optically-anisotropic layer was measured using the above-described method. An average value of secondary ion intensities derived from the surfactant between the depth position D20 corresponding to a thickness of 20% of the optically-anisotropic layer and the position D80 corresponding to a thickness of 80% of the optically-anisotropic layer was calculated from the obtained profile, a peak showing a secondary ion intensity having a size of 1.1 times or more the average value was counted in a region from the position D20 to the position D80, and whether or not a peak showing a secondary ion intensity having a size of 5 times or more the average value was present was investigated.

In the optically-anisotropic layer according to Example 1, in the thickness direction of the optically-anisotropic layer, the position D20 was positioned in the fourth liquid crystal immobilized layer of the ZA layer (0.54 μm and 3.4 layer from the support side), and the position D80 was positioned in the first liquid crystal immobilized layer of the ZC layer (0.54 μm and 3.4 layer from the surface side). Therefore, 10 interfaces from an interface between the fourth layer of the ZA layer and the first layer of the ZB layer to an interface between the ninth layer of the ZB layer and the first layer of the ZC layer were present between the position D20 and the position D80. On the other hand, the number of peaks having a size of 1.1 times or more the average value observed in the above-described profile was 10. That is, a peak corresponding to the position of each of the interfaces was observed. In addition, all the peaks had a size of less than 5 times the average value.

Examples 2 to 6 and Comparative Examples 1 to 3

Diffraction elements according to Examples 2 to 6 and Comparative Examples 1 to 3 in the periodic alignment state where the single period over which the optical axis of the liquid crystal compound rotated by 180° was 1.0 μm were formed using the same method as that of Example 1, except that the liquid crystal composition for forming each of the optically-anisotropic layers and the thicknesses and the number of the liquid crystal immobilized layers were changed as shown in Table 1 and the configuration of each of the optically-anisotropic layers was changed as shown in Table 2. In Example 6, the ZC layer was prepared by forming two liquid crystal immobilized layers having a thickness of 0.16 μm and subsequently forming one liquid crystal immobilized layer having a thickness of 0.28 μm.

In Table 2, T/Λ is a ratio of the distance T between the peaks (that is, the thickness of the liquid crystal immobilized layer) to the single period Λ of the liquid crystal alignment pattern.

In addition, Tables 3 to 5 show the formulation of the liquid crystal composition used in each of Examples and Comparative Examples.

TABLE 1

| | ZA Layer | | | ZB Layer | | | ZC Layer | | |
|---|---|---|---|---|---|---|---|---|---|
| | | Liquid Crystal Immobilized Layer | | | Liquid Crystal Immobilized Layer | | | Liquid Crystal Immobilized Layer | |
| | Kind of Composition | Thickness μm | Number of Layers | Kind of Composition | Thickness μm | Number of Layers | Kind of Composition | Thickness μm | Number of Layers |
| Example 1 | ZA-1 | 0.16 | 4 | ZB-1 | 0.16 | 9 | ZC-1 | 0.16 | 4 |
| Example 2 | ZA-2 | 0.16 | 4 | ZB-2 | 0.16 | 9 | ZC-2 | 0.16 | 4 |
| Example 3 | ZA-3 | 0.16 | 4 | ZB-3 | 0.16 | 9 | ZC-3 | 0.16 | 4 |
| Example 4 | ZA-4 | 0.16 | 4 | ZB-4 | 0.16 | 9 | ZC-4 | 0.16 | 4 |
| Example 5 | ZA-5 | 0.16 | 4 | ZB-5 | 0.16 | 9 | ZC-5 | 0.16 | 4 |
| Example 6 | ZA-6 | 0.16 | 4 | ZB-6 | 0.16 | 9 | ZC-6 | 0.16/0.28 | 2/1 |
| Comparative Example 1 | ZA-7 | 0.16 | 7 | ZB-7 | 0.16 | 15 | ZC-7 | 0.16 | 7 |
| Comparative Example 2 | ZA-8 | 0.16 | 7 | ZB-8 | 0.16 | 15 | ZC-8 | 0.16 | 7 |
| Comparative Example 3 | ZA-9 | 0.16 | 7 | ZB-9 | 0.16 | 15 | ZC-9 | 0.16 | 7 |

TABLE 2

| | Δn | Number of Peaks having Size of 1.1 Times or more Average Value | Peaks having Size of more than 5 Times Average Value | Ratio of Peak Value to Average Value | Single Period Λ | T/Λ | Δn × d |
|---|---|---|---|---|---|---|---|
| Example 1 | 0.24 | 10 | None | 1.8 | 1 | 0.16 | 675 nm |
| Example 2 | 0.24 | 10 | None | 4.2 | 1 | 0.16 | 675 nm |
| Example 3 | 0.24 | 10 | None | 1.1 | 1 | 0.16 | 675 nm |
| Example 4 | 0.24 | 10 | None | 1.1 | 1 | 0.16 | 675 nm |
| Example 5 | 0.24 | 10 | None | 2.1 | 1 | 0.16 | 675 nm |
| Example 6 | 0.24 | 10 | None | 1.9 | 1 | 0.6/0.28 | 675 nm |
| Comparative Example 1 | 0.15 | 0 | None | 1 | 1 | — | 675 nm |
| Comparative Example 2 | 0.15 | 18 | Present | 5.5 | 1 | 0.16 | 675 nm |
| Comparative Example 3 | 0.15 | 18 | Present | 5.5 | 1 | 0.16 | 675 nm |

TABLE 3

| | Liquid Crystal | | Chiral Agent | | Surfactant | | | | | Initiator | | |
|---|---|---|---|---|---|---|---|---|---|---|---|---|
| | | | | | | | | | Zonyl | Irgacure | | Solid |
| | L-1 | L-2 | K-1 | K-2 | T-2 | T-3 | T-4 | T-5 | 8857 | OXE01 | Solvent | Content |
| ZA-1 | 90 | 10 | 0.61 | | 0.8 | | | | | 2 | MEK (50%)/ CPO (50%) | 3% |
| ZA-2 | 90 | 10 | 0.61 | | 1.5 | | | | | 2 | MEK (50%)/ CPO (50%) | 10% |
| ZA-3 | 90 | 10 | 0.61 | | | 1 | | | | 2 | MEK (50%)/ CPO (50%) | 6% |
| ZA-4 | 90 | 10 | 0.61 | | 0.2 | | | | | 2 | MEK (50%)/ CPO (50%) | 8% |
| ZA-5 | 90 | 10 | 0.61 | | | 2 | | | | 2 | MEK (50%)/ CPO (50%) | 3% |
| ZA-6 | 90 | 10 | 0.61 | | 0.8 | | | | | 2 | MEK (50%)/ CPO (50%) | 3% |
| ZA-7 | | 100 | 0.61 | | | | 0.5 | | | 2 | MEK (50%)/ CPO (50%) | 3% |
| ZA-8 | | 100 | 0.61 | | | | | 1 | | 2 | MEK (50%)/ CPO (50%) | 3% |
| ZA-9 | | 100 | 0.61 | | | | | | 1 | 2 | Toluene | 19.6% |

TABLE 4

| | Liquid Crystal | | Chiral Agent | | Surfactant | | | | | Initiator | | |
|---|---|---|---|---|---|---|---|---|---|---|---|---|
| | | | | | | | | | Zonyl | Irgacure | | Solid |
| | L-1 | L-2 | K-1 | K-2 | T-2 | T-3 | T-4 | T-5 | 8857 | OXE01 | Solvent | Content |
| ZB-1 | 90 | 10 | 0.18 | 0.19 | 0.8 | | | | | 2 | MEK (50%)/ CPO (50%) | 3% |
| ZB-2 | 90 | 10 | 0.18 | 0.19 | 1.5 | | | | | 2 | MEK (50%)/ CPO (50%) | 10% |
| ZB-3 | 90 | 10 | 0.18 | 0.19 | | 1 | | | | 2 | MEK (50%)/ CPO (50%) | 6% |
| ZB-4 | 90 | 10 | 0.18 | 0.19 | 0.2 | | | | | 2 | MEK (50%)/ CPO (50%) | 8% |
| ZB-5 | 90 | 10 | 0.18 | 0.19 | | 2 | | | | 2 | MEK (50%)/ CPO (50%) | 3% |
| ZB-6 | 90 | 10 | 0.18 | 0.19 | 0.8 | | | | | 2 | MEK (50%)/ CPO (50%) | 3% |
| ZB-7 | | 100 | 0.18 | 0.19 | | | 1 | | | 2 | MEK (50%)/ CPO (50%) | 3% |
| ZB-8 | | 100 | 0.18 | 0.19 | | | | 1 | | 2 | MEK (50%)/ CPO (50%) | 3% |
| ZB-9 | | 100 | 0.18 | 0.19 | | | | | 1 | 2 | Toluene | 19.6% |

TABLE 5

| | Liquid Crystal | | Chiral Agent | | Surfactant | | | | | Initiator | | |
|---|---|---|---|---|---|---|---|---|---|---|---|---|
| | | | | | | | | | Zonyl | Irgacure | | Solid |
| | L-1 | L-2 | K-1 | K-2 | T-2 | T-3 | T-4 | T-5 | 8857 | OXE01 | Solvent | Content |
| ZC-1 | 90 | 10 | | 0.69 | 0.8 | | | | | 2 | MEK (50%)/ CPO (50%) | 3% |
| ZC-2 | 90 | 10 | | 0.69 | 1.5 | | | | | 2 | MEK (50%)/ CPO (50%) | 10% |
| ZC-3 | 90 | 10 | | 0.69 | | 1 | | | | 2 | MEK (50%)/ CPO (50%) | 6% |
| ZC-4 | 90 | 10 | | 0.69 | 0.2 | | | | | 2 | MEK (50%)/ CPO (50%) | 8% |
| ZC-5 | 90 | 10 | | 0.69 | | 2 | | | | 2 | MEK (50%)/ CPO (50%) | 3% |
| ZC-6 | 90 | 10 | | 0.69 | 0.8 | | | | | 2 | MEK (50%)/ CPO (50%) | 3% |
| ZC-7 | | 100 | | 0.69 | | | 1 | | | 2 | MEK (50%)/ CPO (50%) | 3% |
| ZC-8 | | 100 | | 0.69 | | | | 1 | | 2 | MEK (50%)/ CPO (50%) | 3% |
| ZC-9 | | 100 | | 0.69 | | | | | 1 | 2 | | 19.6% |

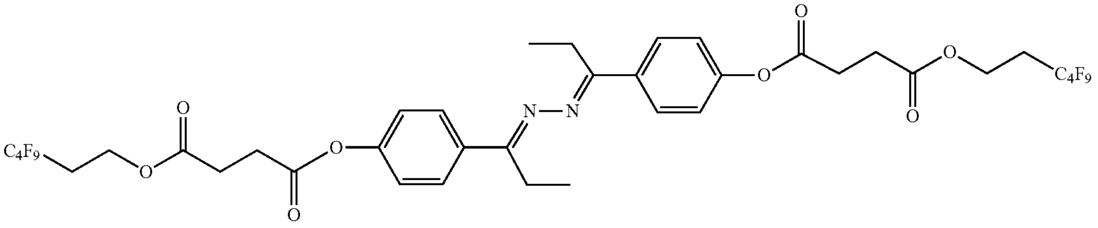

Surfactant T-3

65

Molecular Weight: 989

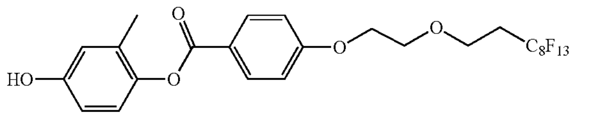

Surfactant T-4

Molecular Weight: 635

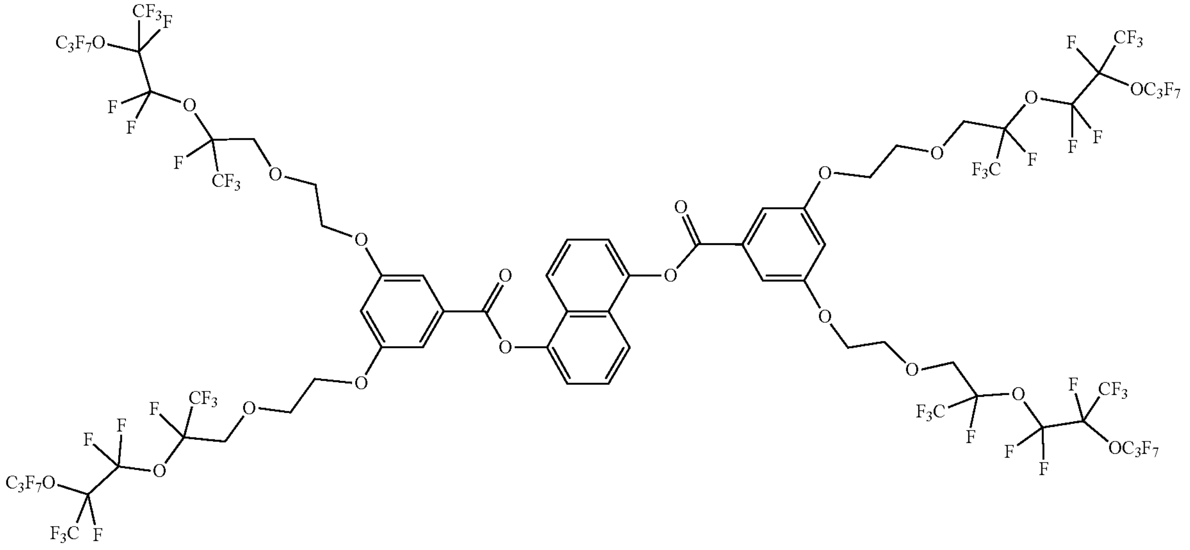

Molecular Weight: 2464.91

Surfactant T-5

Molecular Weight: 2465

[Evaluation]

<Aligning Properties>

The aligning properties of each of the prepared diffraction elements (optically-anisotropic layers) were evaluated using the following method.

The liquid crystal alignment pattern of the prepared diffraction element was observed with a polarization microscope, and the alignment state of the liquid crystal compound was evaluated based on the following evaluation standards.

AA: The liquid crystal alignment pattern was a pattern having no distortion and a very good alignment state A: the liquid crystal alignment pattern was a pattern having a slight amount of distortion and a good alignment state B: the liquid crystal alignment pattern was a pattern where the distortion was verified but the alignment state was maintained C: the liquid crystal alignment pattern was a pattern where a slight amount of alignment defects occurred D: the liquid crystal alignment pattern was a pattern where a large amount of alignment defects occurred <Diffraction Efficiency>

Figure 13:
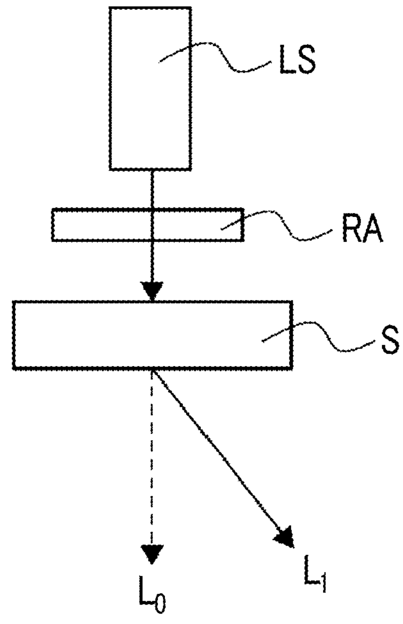
FIG. 13 is a diagram conceptually showing a method of evaluating a diffraction efficiency in Examples.

Using a method shown in FIG. 13, intensities of diffracted light (first-order light) and non-diffracted leaked light (zero-order light) were measured.

Specifically, laser light LS having an output center wavelength of 530 nm was converted into circularly polarized light through a circular polarization plate RA and was vertically incident from a glass substrate side of a sample S of the prepared diffraction element. Transmitted light was captured by a screen disposed at a distance of 20 cm, and intensities of zero-order light $L_0$ and first-order diffracted light $L_1$ were measured by a photodetector. Next, light leak=$L_0/(L_0+L_1)$ was calculated. Regarding the polarization state of laser light incident into the diffraction element, the light leaks of right circularly polarized light and left circularly polarized light were measured, respectively, and a smaller value was adopted. In addition, the diffraction efficiency corresponding to the calculated value of the light leak was evaluated based on the following standards.

AA: the light leak was less than 0.7%

A: the light leak was 0.7% or more and less than 1.0%

B: the light leak was 1.0% or more and less than 1.5%

C: the light leak was 1.5% or more and less than 2.0%

D: the light leak was 2.0% or more

The results are shown in Table 6.

TABLE 6

| | Evaluation | |
|---|---|---|
| | Aligning Properties | Diffraction Efficiency |
| Example 1 | AA | AA |
| Example 2 | A | A |
| Example 3 | AA | AA |
| Example 4 | AA | AA |
| Example 5 | A | A |
| Example 6 | B | B |
| Comparative Example 1 | D | D |
| Comparative Example 2 | D | D |
| Comparative Example 3 | C | C |

It can be seen from Table 6 that the aligning properties of Examples 1 to 6 of the present invention were higher than those of Comparative Examples. As a result, a high diffraction efficiency can be obtained.

All of the surfactants (T-2 and T-3) used in Examples 1 to 6 have a perfluoroalkyl group as a fluorine atom and have 4 or less carbon atoms.

In Comparative Example 1, the optically-anisotropic layer was prepared by the multilayer application, but a peak having a size of 1.1 times or more the average value was not observed in the profile of the secondary ion intensity derived from the surfactant. That is, the amount of uneven distribution of the surfactant in the interface between the liquid crystal immobilized layers was excessively small. The reason for this is that the molecular weight of the surfactant was small and surface uneven distribution properties decreased. In addition, Δn of the optically-anisotropic layer is less than 0.20. Therefore, it can be seen that the aligning properties decreased.

In addition, in Comparative Examples 2 and 3, a peak having a size of 5 times or more the average value was observed in the profile of the secondary ion intensity derived from the surfactant. That is, the amount of uneven distribution of the surfactant in the interface between the liquid crystal immobilized layers was excessively large. The reason for this is that the molecular weight is large and the surfactant of the lower layer surface is not removed by the solvent during the formation of the liquid crystal layer. In this case, the smooth liquid crystal immobilized layer cannot be formed due to the occurrence of cissing during the formation of the next liquid crystal immobilized layer on the lower liquid crystal immobilized layer. Therefore, it can be seen that the aligning properties of the liquid crystal compound deteriorate.

In addition, it can be seen from a comparison between Examples 1 to 5 that the size of the peak in the profile of the secondary ion intensity derived from the surfactant can be adjusted by the addition amount of the surfactant and the ratio of the solvent. In addition, it can be seen that the ratio of the size of the peak to the average value in the profile is preferably 1.1 times to 1.8 times.

In addition, it can be seen that, in a case where the ratio of the size of the peak to the average value in the profile is in a range of 1.1 times to 1.8 times, the aligning properties are further improved and the diffraction efficiency is further improved.

In addition, it can be seen from a comparison between Examples 1 and 6 that the ratio T/Λ of the distance T between the peaks to the single period Λ of the liquid crystal alignment pattern is preferably 0.25 or less.

As can be seen from the above results, the effects of the present invention are obvious.

EXPLANATION OF REFERENCES

10: diffraction element
12, 12*b*, 12*c*, 12*d*: optically-anisotropic layer
13*a*: first liquid crystal immobilized layer
13*b*: second liquid crystal immobilized layer
13*c*: third liquid crystal immobilized layer
13*d*: fourth liquid crystal immobilized layer
13*e*: fifth liquid crystal immobilized layer
30: support
32: alignment film
37*a*, 37*b*, 37*c*: region
38*a* to 38*l*: liquid crystal immobilized layer
40: liquid crystal compound
40A: optical axis
42: bright portion
44: dark portion
60, 80: exposure device
62, 82: laser
64, 84: light source
65:22 plate
68: beam splitter
70A, 70B, 90A, 90B: mirror
72A, 72B, 96:24 plate
86, 94: polarization beam splitter
92: lens
D, $A_1$, $A_2$, $A_3$: arrangement axis
R: region
Λ: single period
$L_1$, $L_2$: incidence light
$L_4$, $L_5$: emitted light
M: laser light
MA, MB: beam
$P_O$: linearly polarized light
$P_R$: right circularly polarized light
$P_L$: left circularly polarized light
α: intersecting angle
MS: S polarized light
MP: P polarized light

What is claimed is:

1. A diffraction element comprising:

an optically-anisotropic layer that has a liquid crystal alignment pattern in which an orientation of an optical axis derived from a liquid crystal compound changes while continuously rotating in at least one in-plane direction, wherein a birefringence Δn of the optically-anisotropic layer is 0.20 or more, the optically-anisotropic layer includes a surfactant, and in a case where components of the optically-anisotropic layer in a depth direction are analyzed by time-of-flight secondary ion mass spectrometry while irradiating the optically-anisotropic layer with an ion beam from one surface to another surface of the optically-anisotropic layer, a depth-direction profile of a secondary ion intensity derived from the surfactant is obtained, a depth position corresponding to a thickness of 20% from the one surface to the other surface side of the optically-anisotropic layer is represented by a position D20, a depth position corresponding to a thickness of 80% from the one surface to the other surface side of the optically-anisotropic layer is represented by a position D80, and an average value of secondary ion intensities derived from the surfactant between the position D20 and the position D80 is calculated, in a region from the position D20 to the position D80, a peak that shows a secondary ion intensity having a size of 1.1 times or more the average value is observed and a peak that shows a secondary ion intensity having a size of 5 times or more the average value is not observed.

2. The diffraction element according to claim 1, wherein in a case where two or more peaks that show the secondary ion intensity having a size of 1.1 times or more the average value are provided, a distance between the peaks adjacent to each other is represented by T, and a length over which the orientation of the optical axis derived from the liquid crystal compound in the liquid crystal alignment pattern rotates by 180° in a plane is set as a single period Λ, the distance T between the peaks and the single period Λ of the liquid crystal alignment pattern satisfy $$0.05 \leq T/\Lambda \leq 0.25.$$

3. The diffraction element according to claim 2, wherein the optically-anisotropic layer has a region where the optical axis of the liquid crystal compound is twisted in a thickness direction, and a twisted angle of the optically-anisotropic layer in the thickness direction is 10° to 360°.

4. The diffraction element according to claim 2, wherein the surfactant includes a fluorine atom and has a molecular weight of 800 to 2000.

5. The diffraction element according to claim 2, wherein the birefringence Δn of the optically-anisotropic layer is 0.40 or less.

6. The diffraction element according to claim 2, wherein the surfactant includes a fluorine atom, the fluorine atom is a perfluoroalkyl group, and the surfactant has 4 or less carbon atoms.

7. The diffraction element according to claim 1, wherein the optically-anisotropic layer has a region where the optical axis of the liquid crystal compound is twisted in a thickness direction, and a twisted angle of the optically-anisotropic layer in the thickness direction is 10° to 360°.

8. The diffraction element according to claim 7, wherein the surfactant includes a fluorine atom and has a molecular weight of 800 to 2000.

9. The diffraction element according to claim 7, wherein the birefringence Δn of the optically-anisotropic layer is 0.40 or less.

10. The diffraction element according to claim 1, wherein the surfactant includes a fluorine atom and has a molecular weight of 800 to 2000.

11. The diffraction element according to claim 10, wherein the surfactant includes a fluorine atom, the fluorine atom is a perfluoroalkyl group, and the surfactant has 4 or less carbon atoms.

12. The diffraction element according to claim 10, wherein the birefringence Δn of the optically-anisotropic layer is 0.40 or less.

13. The diffraction element according to claim 1, wherein the birefringence Δn of the optically-anisotropic layer is 0.40 or less.

14. The diffraction element according to claim 13, wherein the surfactant includes a fluorine atom, the fluorine atom is a perfluoroalkyl group, and the surfactant has 4 or less carbon atoms.

15. The diffraction element according to claim 1, wherein the surfactant includes a fluorine atom, the fluorine atom is a perfluoroalkyl group, and the surfactant has 4 or less carbon atoms.

* * * * *